(12) United States Patent
Tsunoya et al.

(10) Patent No.: US 9,242,498 B2
(45) Date of Patent: Jan. 26, 2016

(54) PRINTING METHOD, PRINTING DEVICE, PRINTED MATERIAL AND MOLDED ARTICLE

(75) Inventors: Akihiko Tsunoya, Nagano (JP); Keigo Sugai, Nagano (JP); Yoshikazu Hama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 60 days.

(21) Appl. No.: 13/557,311

(22) Filed: Jul. 25, 2012

(65) Prior Publication Data
US 2013/0027488 A1 Jan. 31, 2013

(30) Foreign Application Priority Data

Jul. 26, 2011 (JP) .................................. 2011-162896
Jul. 26, 2011 (JP) .................................. 2011-162897

(51) Int. Cl.
| *B41J 2/01* | (2006.01) |
| *B41J 2/015* | (2006.01) |
| *G01D 11/00* | (2006.01) |
| *B41M 7/00* | (2006.01) |
| *B41M 5/00* | (2006.01) |
| B41J 11/00 | (2006.01) |
| C09D 11/40 | (2014.01) |
| C09D 11/30 | (2014.01) |

(52) U.S. Cl.
CPC .............. *B41M 7/009* (2013.01); *B41M 5/0023* (2013.01); *B41M 5/0047* (2013.01); *B41M 5/0064* (2013.01); *B41M 7/0081* (2013.01); B41J 11/002 (2013.01); B41J 11/0015 (2013.01); C09D 11/30 (2013.01); C09D 11/40 (2013.01)

(58) Field of Classification Search
CPC .... B41J 11/0015; B41J 11/002; C09D 11/30; C09D 11/32; C09D 11/322; C09D 11/326; C09D 11/328; C09D 11/36; C09D 11/38; C09D 11/40; C09D 11/54; B41M 7/009; B41M 5/0064; B41M 7/0081; B41M 5/0047
USPC ............................... 347/102, 21, 100; 283/72
See application file for complete search history.

(56) References Cited

U.S. PATENT DOCUMENTS

| 6,145,979 A  * | 11/2000 | Caiger et al. ................... 347/102 |
| 6,498,202 B1 * | 12/2002 | Sun et al. ....................... 523/160 |
| 7,041,228 B2 * | 5/2006  | Heidari ............................ 216/40 |
| 7,575,774 B2 * | 8/2009  | Suzuki et al. .................... 427/58 |
| 7,942,960 B2 * | 5/2011  | Sano et al. .................... 106/31.6 |

(Continued)

FOREIGN PATENT DOCUMENTS

| JP | 2001-343260 A | 12/2001 |
| JP | 2007-100054 A | 4/2007 |

(Continued)

*Primary Examiner* — Julian Huffman
*Assistant Examiner* — Leonard S Liang
(74) *Attorney, Agent, or Firm* — Global IP Counselors, LLP

(57) ABSTRACT

With the printing method according to the above described aspect of the present invention, when first ink and second ink made of resin are placed on a printing medium, a first dot for which a first ink droplet land on the printing medium and a plurality of second dots for which a plurality of second ink droplets land on the printing medium are in contact, but adjacent ones of the second dots are separated from each other. With this printing method, the first ink is high in stretchability, and the glass transition point when the second ink is cured is higher than the glass transition point when the first ink is cured.

10 Claims, 17 Drawing Sheets

(56) References Cited

U.S. PATENT DOCUMENTS

| | | | |
|---|---|---|---|
| 8,016,408 B2* | 9/2011 | Sugai | 347/102 |
| 8,123,346 B2* | 2/2012 | Ohnishi et al. | 347/102 |
| 8,215,764 B2* | 7/2012 | Sano et al. | 347/105 |
| 8,430,495 B2* | 4/2013 | Oyanagi et al. | 347/100 |
| 2002/0024544 A1* | 2/2002 | Codos | 347/8 |
| 2002/0081393 A1* | 6/2002 | Kjellqvist et al. | 427/558 |
| 2003/0189626 A1* | 10/2003 | Kataoka et al. | 347/98 |
| 2004/0226929 A1* | 11/2004 | Miura | B41M 3/006 219/121.85 |
| 2004/0257419 A1* | 12/2004 | Iinuma et al. | 347/100 |
| 2005/0203210 A1* | 9/2005 | Kataoka et al. | 523/160 |
| 2006/0230969 A1* | 10/2006 | Vosahlo | 101/488 |
| 2008/0075884 A1* | 3/2008 | Hayata | B29C 59/02 427/542 |
| 2009/0068418 A1 | 3/2009 | Iwase et al. | |
| 2009/0244116 A1 | 10/2009 | Ohnishi | |
| 2010/0194838 A1* | 8/2010 | Mitsuzawa | 347/102 |
| 2010/0201772 A1* | 8/2010 | Mitsuzawa | 347/102 |
| 2012/0062666 A1* | 3/2012 | Roof et al. | 347/102 |
| 2012/0263926 A1* | 10/2012 | Sugai | 428/201 |
| 2012/0274716 A1* | 11/2012 | McConville | B41M 5/38207 347/102 |
| 2013/0281593 A1* | 10/2013 | Yamazaki et al. | 524/377 |

FOREIGN PATENT DOCUMENTS

| | | | |
|---|---|---|---|
| JP | 2008-074036 A | | 4/2008 |
| JP | 2009-096043 A | | 5/2009 |
| JP | 2009113292 A | * | 5/2009 |
| JP | 2009-221416 A | | 10/2009 |
| JP | 2009-233978 A | | 10/2009 |
| JP | 2010173082 A | * | 8/2010 |

* cited by examiner

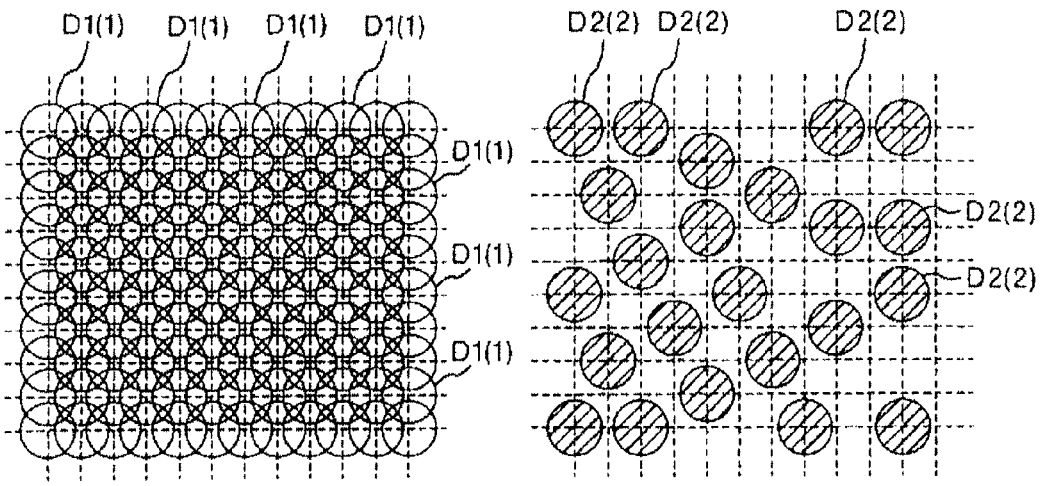
Fig. 20A   Fig. 20B
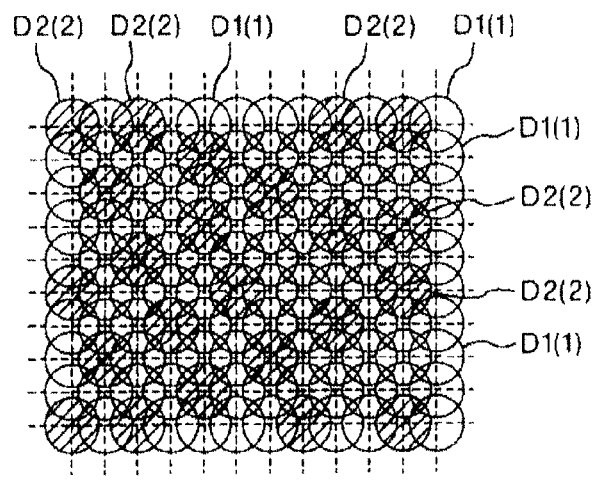
Fig. 20C
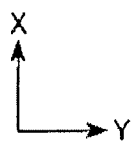

| | | DISPLAY COLOR | | | |
|---|---|---|---|---|---|
| | | DISPLAY COLOR 1 | DISPLAY COLOR 2 | DISPLAY COLOR 3 | ... |
| PRINT MEDIUM | MATERIAL 1 | Y:C:M:K:W =1:0:0:0:0.5 | Y:C:M:K:W =1:0:0.25:0:0.7 | Y:C:M:K:W =1:0:1:0.25:1.3 | ... |
| | MATERIAL 2 | Y:C:M:K:W =1:0.25:0:0:0.6 | Y:C:M:K:W =1:0:0.5:0:0.8 | Y:C:M:K:W =1:0:1:0.5:1.4 | ... |
| | MATERIAL 3 | Y:C:M:K:W =1:0.5:0:0:0.7 | Y:C:M:K:W =1:0:0.75:0:0.9 | Y:C:M:K:W =1:0:1:0.75:1.5 | ... |
| | ⋮ | ⋮ | ⋮ | ⋮ | ... |

Fig. 25

PRINTING METHOD, PRINTING DEVICE, PRINTED MATERIAL AND MOLDED ARTICLE

CROSS-REFERENCE TO RELATED APPLICATIONS

This application claims priority to Japanese Patent Application Nos. 2011-162896 and 2011-162897 both filed on Jul. 26, 2011. The entire disclosures of Japanese Patent Application Nos. 2011-162896 and 2011-162897 are hereby incorporated herein by reference.

BACKGROUND

1. Technical Field

The present invention relates to a printing method, a printing device, a printed material and a molded article.

2. Related Art

For a display panel that is a display unit of a speedometer as an internal component of an automobile, for example, there are items known to have a substrate and a printed layer printed using ink on the substrate (e.g. see Japanese Laid-Open Patent Application Publication No. 2001-343260). As the ink used for internal components of an automobile, typically, items with relatively high stretchability during curing are used. One reason for this is because the automobile interior temperature can reach 50° C. or greater in the hot sun in the middle of summer.

However, when forming a printing layer using only high stretchability inks, when, for example, machine processing such as drawing, stamping or the like is implemented on a display panel, there was the problem of cracking or peeling occurring on the printing layer, so the display panel became unusable, in other words, it became a defective item.

SUMMARY

An object of the present invention is to provide a printing method and printing device which have excellent workability when coating a first ink and a second ink on a printing medium which forms a sheet, for example, and when implementing processing on that coated surface, and to provide a printed material which has excellent workability when implementing processing on a printed layer on which are formed the first ink and second ink, and a molded article for which processing is performed well when implementing machine processing on the printed layer formed by the first ink and the second ink.

The objectives described above are achieved by the present invention described below.

A printing method according to one aspect of the present invention is a method for printing on a printing medium including: placing a first ink containing a first polymerization initiator and a first polymerizable compound and a second ink containing a second polymerization initiator and a second polymerizable compound as droplets on the printing medium, the first ink having stretchability of 70% or greater when the first ink is cured and made to be a 5 μm thick film and the film is stretched in an environment of 150° C., a cured substance of the second ink obtained by curing the second ink having a glass transition point which is higher than a glass transition point of a cured substance of the first ink obtained by curing the first ink; and curing the first ink and the second ink. The placing of the first ink and the second ink on the printing medium includes placing the droplets such that a first dot formed by a droplet of the first ink landed on the printing medium contacts a plurality of second dots formed by a plurality of droplets of the second ink landed on the printing medium, but adjacent ones of the second dots are separated from each other.

As a result, there is excellent workability when a first ink and second ink are coated on a printing medium forming a sheet, for example, and processing is performed on the coated surface.

With the printing method according to the above described aspect of the present invention, it is preferable that a total volume of the first ink is greater than a total volume of the second ink.

As a result, it is possible to reliably prevent the loss of stretchability of items for which the first ink is cured by items for which the second ink is cured.

With the printing method according to the above described aspect of the present invention, it is preferable that the glass transition point of the cured substance for which the first ink has been cured be less than 100° C., and the glass transition point of the cured substance for which the second ink has been cured be 100° C. or greater.

As a result, there is very excellent workability when a first ink and second ink are coated on a printing medium forming a sheet, for example, and processing is performed on the coated surface.

With the printing method according to the above described aspect of the present invention, it is preferable that a difference between the glass transition point of the cured substance of the first ink and the glass transition point of the cured substance of the second ink is 300° C. or less.

As a result, there is very excellent workability when a first ink and second ink are coated on a printing medium forming a sheet, for example, and processing is performed on the coated surface.

With the printing method according to the above described aspect of the present invention, it is preferable that, of a total mass of the first polymerizable compound, a monofunctional polymerizable compound is 65 mass % or greater, and of the total mass of the second polymerizable compound, a multifunctional polymerizable compound is 50 mass % or greater.

As a result, the part constituted by already cured ink has good stretchability, and also, this becomes an item which is excellent in terms of, for example, impact resistance, wear resistance (abrasion resistance), scratch resistance, and solvent resistance, further improving workability.

A printing method according to another aspect of the present invention is a method for printing on a printing medium to obtain a printed material. The printing method includes: coating the printing medium with a first ink and a second ink so that the first ink and the second overlap on the printing medium to form a coated film, the first ink containing a first polymerization initiator and a first polymerizable compound and the second ink containing a second polymerization initiator and a second polymerizable compound, a second glass transition point of a cured substance of the second ink obtained by curing the second ink is higher than a first glass transition point of a cured substance of the first ink obtained by curing the first ink; curing the coated film to make a cured film; and heating the cured film at least once at a temperature of the first glass transition point or greater.

As a result, there is excellent workability when a first ink and second ink are coated on a printing medium forming a sheet, for example, and processing is performed on the coated surface.

With the printing method according to the above described aspect of the present invention, it is preferable that the first glass transition point be less than an upper limit value of the usage environment temperature in which the printed material is used, and the second glass transition point be the upper limit value or greater.

As a result, the part constituted by already cured ink has good stretchability, and also, this becomes an item which is excellent in terms of, for example, impact resistance, wear resistance (abrasion resistance), scratch resistance, and solvent resistance, further improving workability.

A printing device according to another aspect of the present invention is adapted to perform printing on a printing medium. The printing device includes a droplet discharge head and a control device. The droplet discharge head is configured and arranged to discharge a first ink containing a first polymerization initiator and a first polymerizable compound and a second ink containing a second polymerization initiator and a second polymerizable compound as droplets on the printing medium so that the first ink and the second ink are cured thereafter, the first ink having stretchability of 70% or greater when the first ink is cured and made to be a 5 µm thick film and the film is stretched in an environment of 150° C., a cured substance of the second ink obtained by curing the second ink having a glass transition point which is higher than a glass transition point of a cured substance of the first ink obtained by curing the first ink. The control device is configured and arranged to control the droplet discharge head to place the droplets on the printing medium such that a first dot formed by a droplet of the first ink landed on the printing medium contacts a plurality of second dots formed by a plurality of droplets of the second ink landed on the printing medium, but adjacent ones of the second dots are separated from each other.

As a result, there is excellent workability when a first ink and second ink are coated on a printing medium forming a sheet, for example, and processing is performed on the coated surface.

A printed material according to another aspect of the present invention includes a printing medium, and a printed layer made by a first ink containing a first polymerization initiator and a first polymerizable compound and a second ink containing a second polymerization initiator and a second polymerizable compound being placed as droplets on the printing medium and cured, the first ink having stretchability of 70% or greater when the first ink is cured and made to be a 5 µm thick film and the film is stretched in an environment of 150° C., a cured substance of the second ink obtained by curing the second ink having a glass transition point which is higher than a glass transition point of a cured substance of the first ink obtained by curing the first ink. When the first ink and the second ink are placed on the printing medium, the droplets are placed such that a first dot formed by a droplet of the first ink landed on the printing medium contacts a plurality of second dots formed by a plurality of droplets of the second ink landed on the printing medium, but adjacent ones of the second dots are separated from each other.

As a result, there is excellent workability when performing processing on a printed layer formed with a first ink and second ink.

A molded article according to another aspect of the present invention is formed by machine processing the printed material according to the above described aspect.

As a result, processing is performed well when doing machine processing on a printed layer formed using the first ink and second ink.

BRIEF DESCRIPTION OF THE DRAWINGS

Referring now to the attached drawings which form a part of this original disclosure:

FIGS. 20A to 20C are plan views showing the state with the first ink and second ink respectively placed on the printing medium using the printing device of the present invention (third embodiment).

FIG. 25 is a table as the calibration curve stored by the printing device of the present invention (eighth embodiment).

DETAILED DESCRIPTION OF EXEMPLARY EMBODIMENTS

Following, we will give a detailed description of the printing method, printing device, printed material, and molded article of the present invention based on preferred embodiments shown in the attached drawings.

First Embodiment

Figure 1:
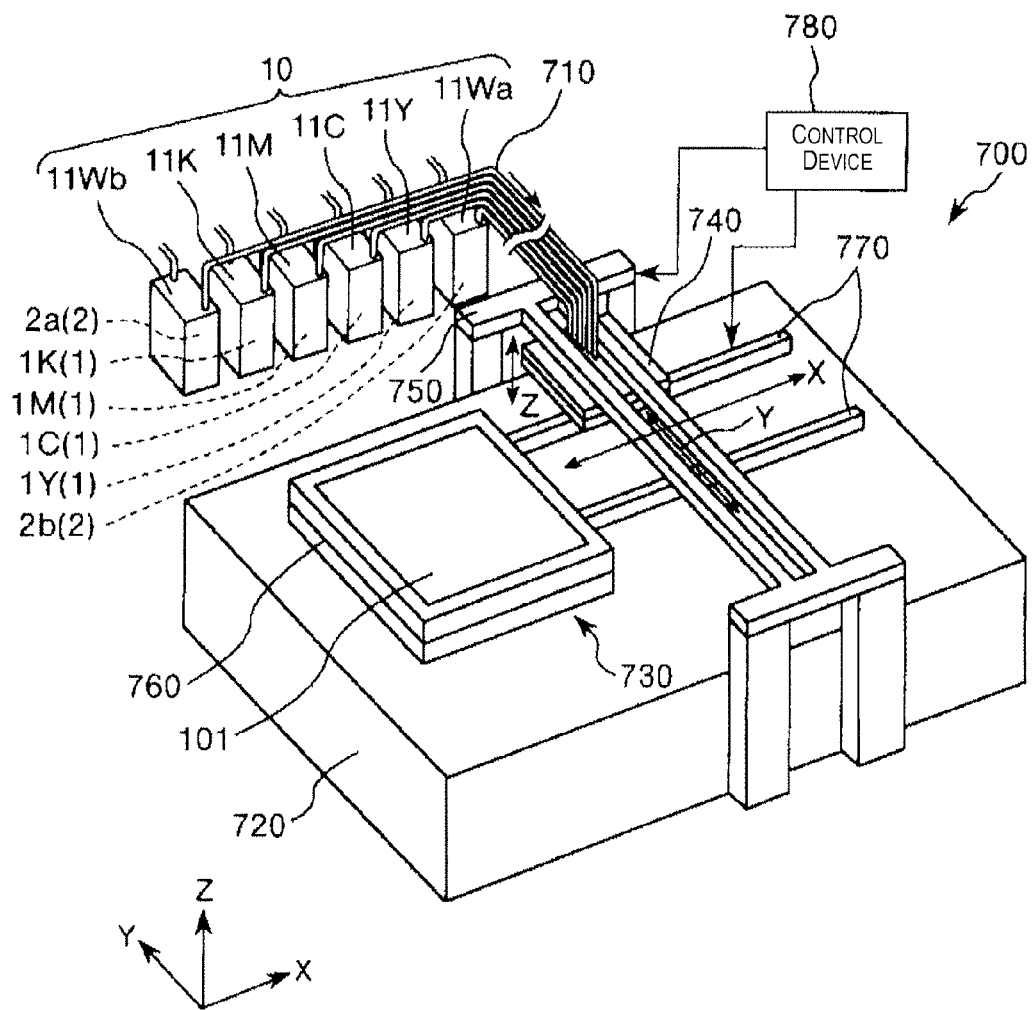
FIG. 1 is a perspective view showing a first embodiment of the printing device of the present invention.
Figure 2:
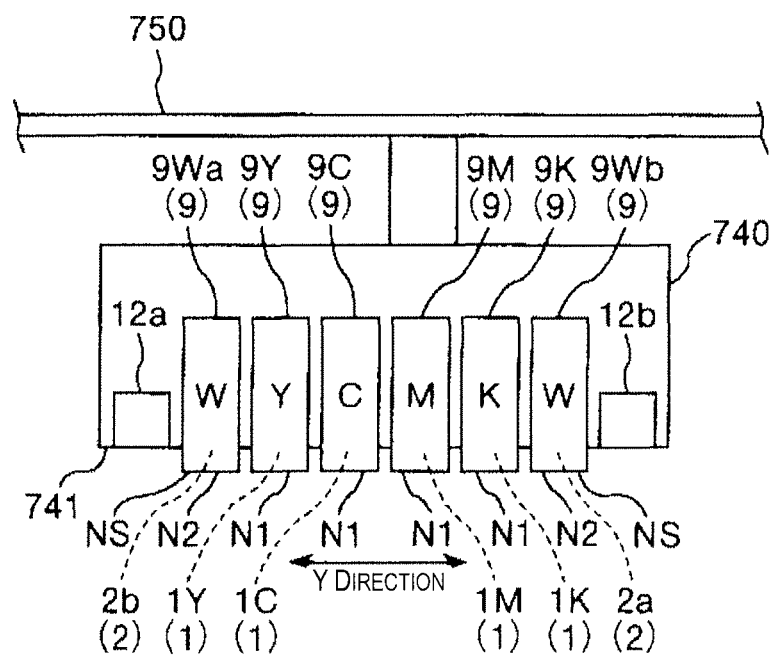
FIG. 2 is a side view showing the schematic structure of the carriage of the printing device shown in FIG. 1.
Figure 3:
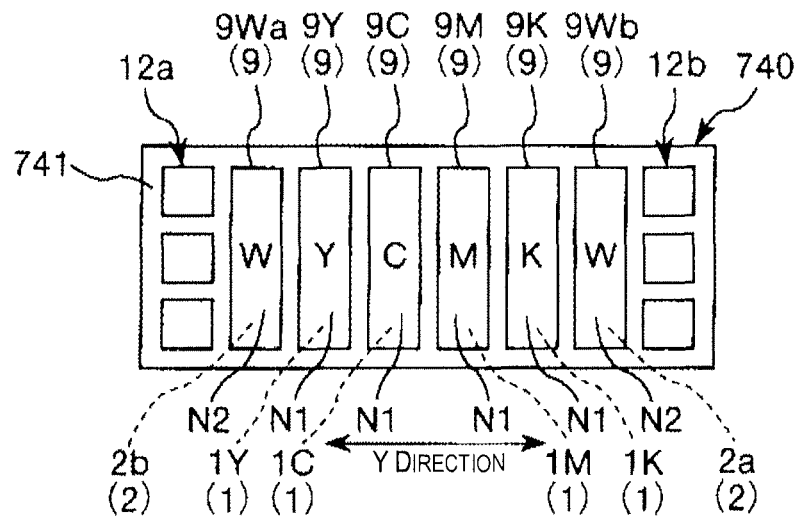
FIG. 3 is a bottom view showing the schematic structure of the carriage of the printing device shown in FIG. 1.
Figure 6:
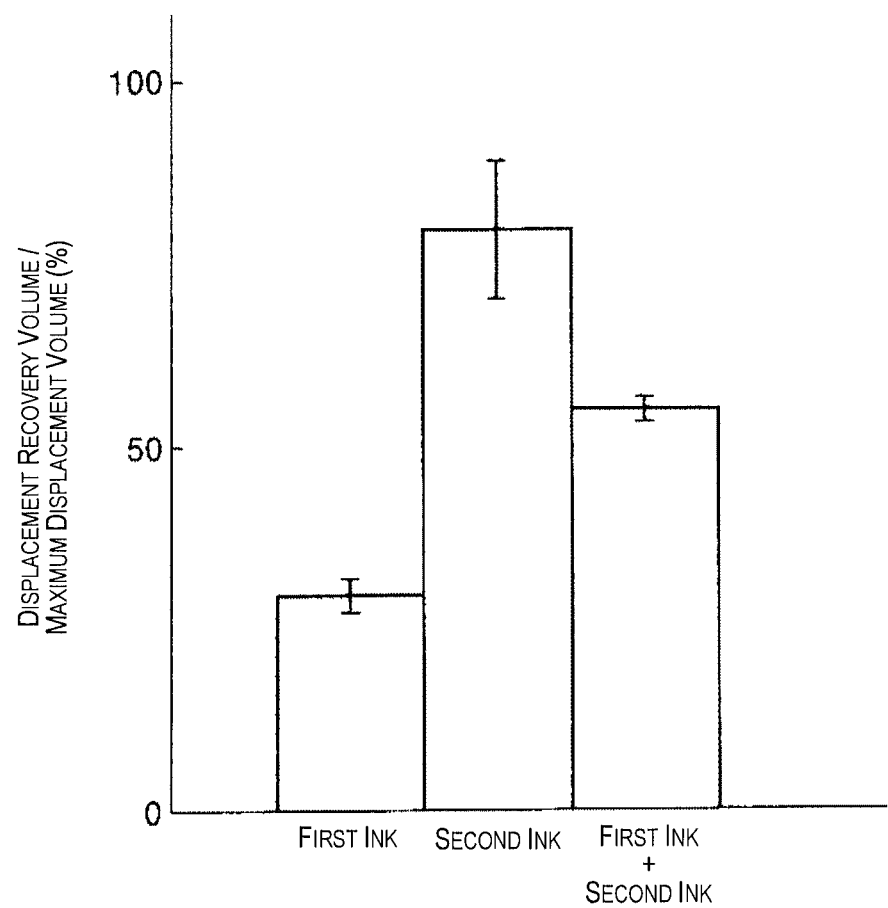
FIG. 6 is a graph showing the recovery rate (displacement recovery volume/maximum displacement volume) of a film consisting of the first ink, a film consisting of the second ink, and a film consisting of a mixed ink of the first ink and second ink.
Figure 7:
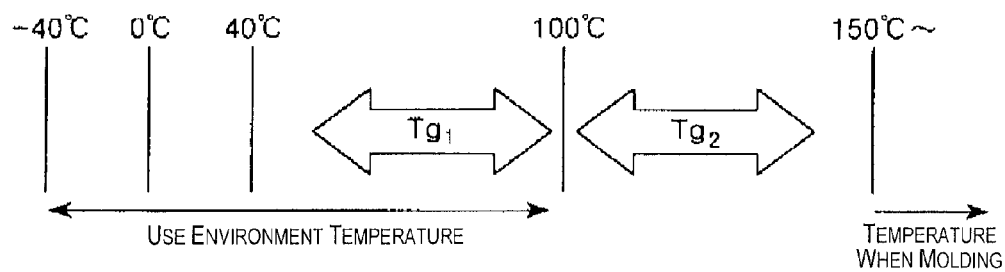
FIG. 7 is a drawing showing the size relationship of the first glass transition point and the second glass transition point.
Figure 8:
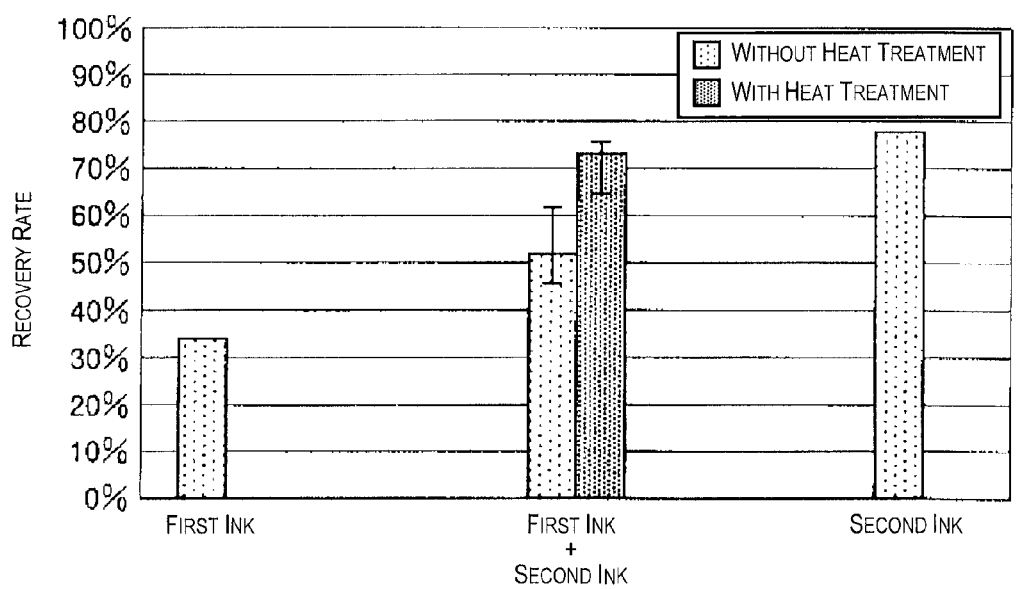
FIG. 8 is a graph showing each recovery rate (displacement recovery volume/maximum displacement volume) of a film consisting of the first ink, a film consisting of the second ink, and a film consisting of a mixed ink of the first ink and second ink.

FIG. 1 is a perspective view showing the printing device used when obtaining the printed material of the present invention. FIG. 2 is a side view showing the schematic structure of the carriage of the printing device shown in FIG. 1. FIG. 3 is a bottom view showing the schematic structure of the carriage of the printing device shown in FIG. 1. FIG. 4 is a drawing showing the schematic structure of the droplet discharge head of the printing device shown in FIG. 1. FIGS. 5A to 5D are perspective views for explaining the characteristics of the first ink. FIG. 6 is a graph showing the recovery rate (displacement recovery volume/maximum displacement volume) of a film consisting of the first ink, a film consisting of the second ink, and a film consisting of a mixed ink of the first ink and second ink. FIG. 7 is a drawing showing the size relationship of the first glass transition point and the second glass transition point. FIG. 8 is a graph showing each recovery rate (displacement recovery volume/maximum displacement volume) of a film consisting of the first ink, a film consisting of the second ink, and a film consisting of a mixed ink of the first ink and second ink. FIG. 9 through FIG. 17 are partial cross section views showing the sequence of steps for manufacturing the printed material of the present invention, as well as manufacturing a molded article thereafter. FIGS. 18A to 18C are plan views showing the state with the first ink and second ink respectively placed on the printing medium using the printing device shown in FIG. 1. Note that hereafter, for purposes of explanation, in FIG. 1, FIG. 2, FIGS. 4B and C, FIGS. 5A to 5D, and FIG. 9 through FIG. 17, the top side will be called "top" and the bottom side will be called "bottom." Also, in FIG. 9 through FIG. 17, the left side will be called "left" and the right side will be called "right."

Figure 15:
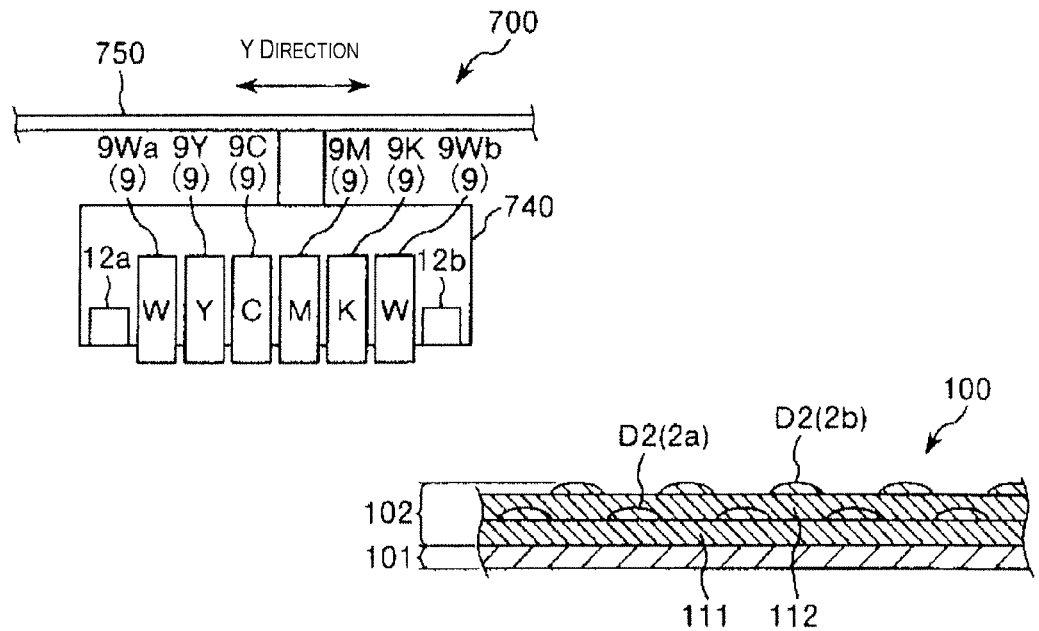
FIG. 15 is a partial cross section view showing the sequence of steps for manufacturing the printed material of the present invention, as well as manufacturing a molded article thereafter.
Figure 16:
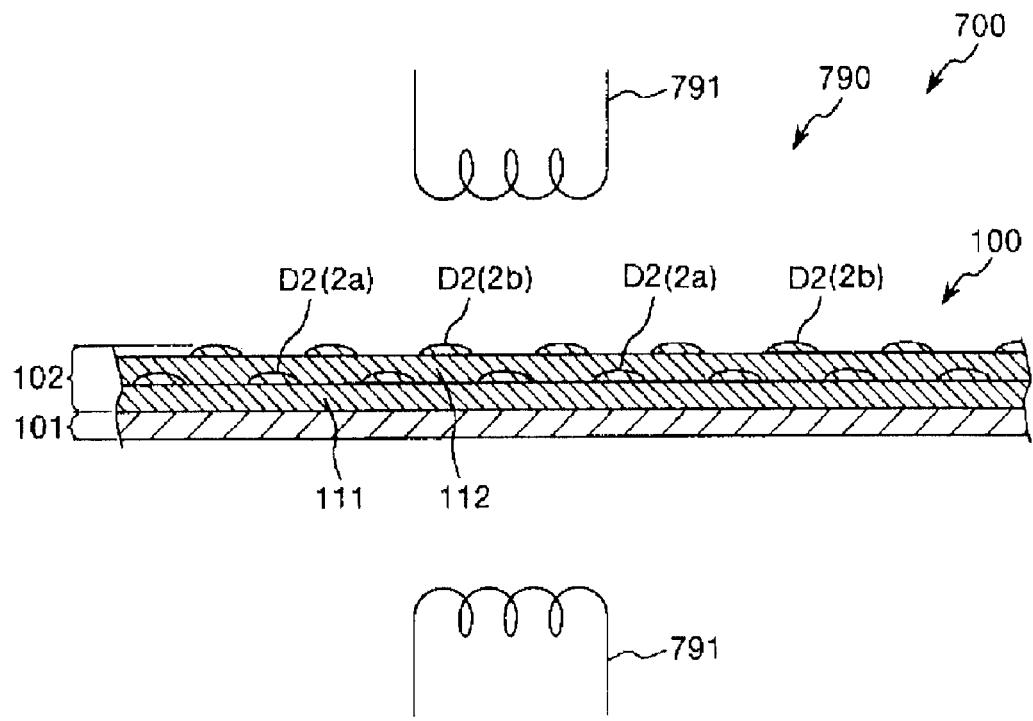
FIG. 16 is a partial cross section view showing the sequence of steps for manufacturing the printed material of the present invention, as well as manufacturing a molded article thereafter.

The printing device 700 shown in FIG. 1 is loaded with an ink set 10, and is a device for manufacturing the printed material 100 shown in FIG. 15 and FIG. 16 in that loaded state. Then, this printed material 100 is the parent material of the molded article 200 shown in FIG. 17. The molded article 200 is used, for example, as an internal component of an automobile such as a speedometer or the like, an external component of an electrical product, a mask, a signboard or the like.

The ink set 10 is equipped with a Y (yellow) first ink 1Y, a C (cyan) first ink 1C, an M (magenta) first ink 1M, a K (black) first ink 1K, and W (colorless transparent) second inks 2a and 2b. With this embodiment, the first ink 1Y is stored in tank 11Y, the first ink 1C is stored in tank 11C, the first ink 1M is stored in tank 11M, the first ink 1K is stored in tank 11K, the second ink 2a is stored in tank 11Wa, the second ink 2b is stored in tank 11Wb, and these are sprayed as droplets L using the inkjet method. Following, when not differentiating between first inks 1Y, 1C, 1M, and 1K, these will simply be called "first ink 1." Similarly, when not differentiating between second inks 2a and 2b, these will simply be called "second ink 2." Also, when not differentiating between first ink 1 and second ink 2, these will simply be called "ink."

First, we will describe the printed material 100.

Printed Material

As shown in FIG. 15 and FIG. 16, the printed material 100 is constituted by a base material (substrate) 101 as the printing medium, and a printed layer 102 formed on the base material 101.

The structural material of the base material 101 is not particularly restricted, and for example it is possible to use various types of resin, various types of glass, and various types of metal or the like, but it is preferable to use resin materials from the perspective of implementing machine processing and doing deformation.

There are no particular restrictions on resin materials, and examples include polyethylene, polypropylene, ethylene-propylene copolymer, ethylene-vinyl acetate copolymer (EVA) and other polyolefins, cyclic polyolefins, modified polyolefins, polyvinyl chloride, polyvinylidene chloride, polystyrene, polyamide, polyimide, polyamide imide, polycarbonate, poly(4-methylpentene-1), ionomer resins, acrylic resins, polymethyl methacrylate, acrylonitrile-butadiene-styrene copolymer (ABS resin), acrylonitrile-styrene copolymer (AS resin), butadiene-styrene copolymer, polyoxymethylene, polyvinyl alcohol (PVA), ethylene-vinyl alcohol copolymer (EVOH), polyethylene terephthalate (PET), polybutylene terephthalate (PBT), polycyclohexane terephthalate (PCT) and other polyesters, polyether, polyether ketone (PEK), polyether ether ketone (PEEK), polyether imide, polyacetal (POM), polyphenylene oxide, modified polyphenylene oxide, polysulfone, polyether sulfone, polyphenylene sulfide, polyarylate, aromatic polyester (liquid crystal polymer), and the like, or copolymers, blends, and polymer alloys having these compounds as primary components. These compounds may be used individually or in combinations of two or more types (e.g., as a laminate of two or more layers).

The printed layer 102 is made by printing using first ink 1, specifically, at least one color of ink among first inks 1Y, 1C, 1M, and 1K, and second ink 2. Supplying of the first ink 1 and the second ink 2 onto the base material 101 is performed by spraying (placing) each ink on the base material 101 as droplets L using the inkjet type printing device 700. Then, the ink on this base material 101 is cured by radiating ultraviolet rays and becomes the printed layer 102.

Also, as the thickness of the base material 101 and the thickness of the printed layer 102, this depends on what the molded article 200 is, specifically, what the molded article 200 will be used for, but for example in the case when the molded article 200 is a speedometer panel of an automobile, the thickness of the base material 101 is preferably 0.1 mm to 2 mm, and more preferably 0.3 mm to 0.8 mm. The thickness of the printed layer 102 is preferably 5 to 200 μm, and more preferably 5 to 100 μm.

The molded article 200 is obtained by implementing machine processing on a printed material 100 such as that described above.

Next, we will describe this molded article 200.

Molded Article

Figure 17:
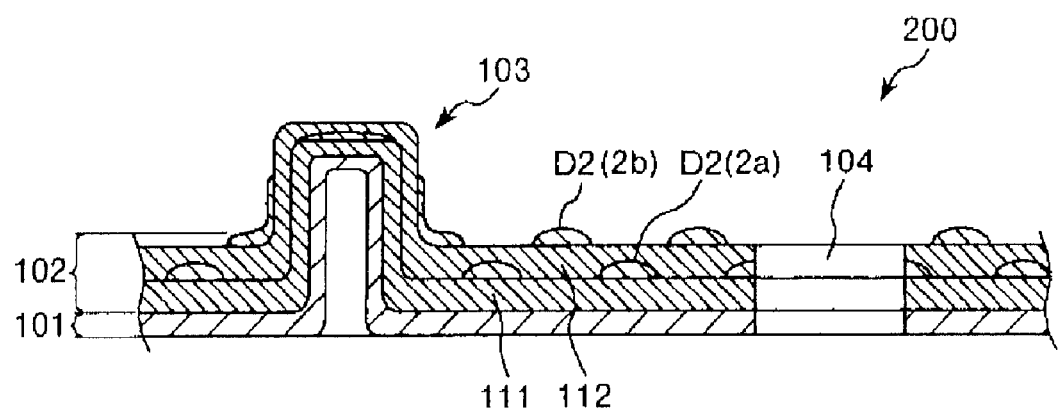
FIG. 17 is a partial cross section view showing the sequence of steps for manufacturing the printed material of the present invention, as well as manufacturing a molded article thereafter.
Figures 18A, 18B:
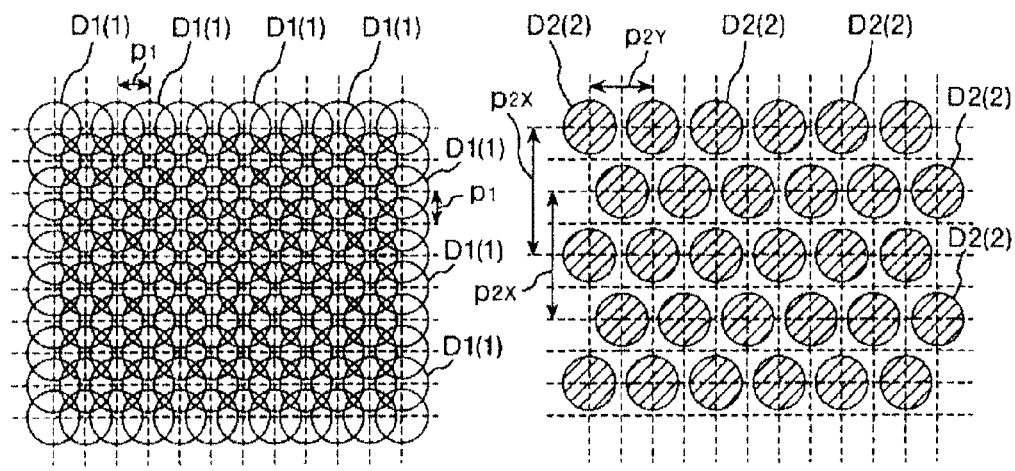
FIGS. 18A to 18C are plan views showing the state with the first ink and second ink respectively placed on the printing medium using the printing device shown in FIG. 1.
Figure 18C:
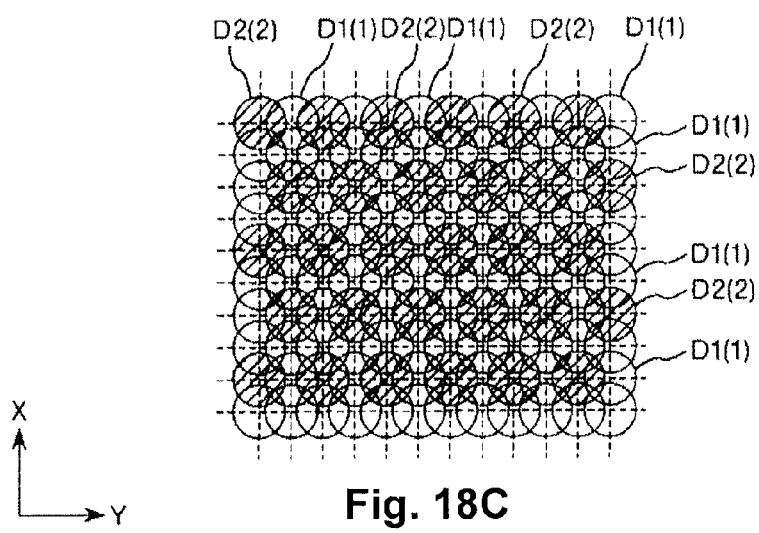

As shown in FIG. 17, the molded article 200 has a cylindrical part with a bottom 103, and an opening 104 at a position different from the cylindrical part with a bottom 103 at the part on which the printing layer 102 of the printed material 100 is formed. The cylindrical part with a bottom 103 is formed by implementing drawing. The opening 104 was formed by implementing stamping. As a device used for this kind of processing, it is possible to use a machine tool such as an NC machine or the like.

Next, we will describe the ink set 10.

Ink Set

The ink set 10 is equipped with a first ink which is a radiation-curing (ultraviolet ray curing type) ink containing pigments as colorants, and a second ink 2 which is a radiation-curing (ultraviolet ray curing type) ink which does not contain pigment.

For the radiation-curing ink, an item that cures with high sensitivity to form high resolution images is desired. By achieving more high sensitivity inks, a high curability level is given by radiation using activating radiation, so in addition to longer product life or the like due to reduced power consumption or a reduced load on the radiation generation device, there are other various advantages such as being able to suppress volatilization of uncured low molecular substances, a decrease in the formed image strength and the like.

The first ink 1 contains (a-1) a polymerization initiator (first polymerization initiator) and (b-1) a polymerizable compound (first polymerizable compound), and it is preferable that of the total mass of the (b-1) polymerizable compound, 65 mass % or greater is a monofunctional polymerizable compound (hereafter also referred to as "monofunctional monomer").

The second ink 2 contains (a-2) a polymerization initiator (second polymerization initiator) and (b-2) a polymerizable compound (second polymerizable compound), and it is preferable that of the total mass of the (b-2) polymerizable compound, 50 mass % or greater is a multifunctional polymerizable compound (hereafter also referred to as "multifunctional monomer").

With the ink, the mass ratio of the monofunctional polymerizable compound to the total mass of the polymerizable compound in the ink is also called the "monofunctional monomer ratio," and the mass ratio of the multifunctional polymerizable compound to the total mass of the polymerizable compound in the ink is also called the "multifunctional monomer ratio." The monofunctional monomer ratio (%) and the multifunctional monomer ratio (%) should have decimal points rounded off to the nearest whole number.

The ink is a radiation-curing ink that can be cured by radiation with activating radiation. The term "activating radiation" noted above, provided that the radiation can provide energy sufficient to cause the generation of initiators in the inks as a result of radiation, broadly includes, without particular restrictions, α-radiation, β-radiation, γ-radiation, X-rays, ultraviolet light (UV), visible light, electron beams, and the like, and among these, ultraviolet light and electron beams are preferred from the standpoint of curing sensitivity and ease of procurement of devices, with ultraviolet light being particularly preferred. Therefore, it is preferable for the ink to be an ink that can be cured by radiation with ultraviolet light used as the radiation.

Following, we will describe the respective components of the inks.

(a) Polymerization Initiator

A well-known radical polymerization initiator or a well-known cationic polymerization initiator may be used as the polymerization initiator for both the first ink 1 and the second ink 2. One type of polymerization initiator may be used, or two or more types may be used in conjunction. A radical polymerization initiator and a cationic polymerization initiator may be used in conjunction.

The polymerization initiator is a compound that generates polymerization initiators by absorbing external energy. The external energy that is used in order to initiate polymerization is broadly categorized into heat and activating radiation, and thermal polymerization initiators and photopolymerization initiators may be used respectively. Examples of activating radiation include γ-radiation, β-radiation, electron beams, ultraviolet light, visible light, and infrared light.

In addition, the ink preferably contains a radical polymerization initiator when a radical polymerizable compound is used as the polymerizable compound, and preferably contains a cationic polymerization initiator when the polymerizable compound is a cationic polymerizable compound.

Radical Polymerization Initiator

Examples of radical polymerization initiators include aromatic ketones, acyl phosphine compounds, aromatic ionium salt compounds, organic peroxides, thio compounds, hexaryl biimidazole compounds, keto oxime ester compounds, borate compounds, azinium compounds, metallocene compounds, active ester compounds, compounds having carbon-halogen bonding, and alkyl amine compounds. The radical polymerization initiator may be individual compounds or combinations of the compounds described above. The radical polymerization initiators may be used individually, or two or more types may be used in conjunction.

Cationic Polymerization Initiator

Examples of cationic polymerization initiators (photoacid generators) include compounds used in chemically sensitized photoresists and in photocationic polymerization, for example (refer to Organic Electronics Materials Research Group, Published by Bunshin Shuppan (1993), pp. 187-192).

Firstly, examples that may be cited include as $B(C_6F_5)_4^-$, $PF_6^-$, $ASF_6^-$, $SbF_6^-$, and $CF_3SO_3^-$ salts of diazonium, ammonium, iodonium, sulfonium, phosphonium and other aromatic onium compounds. Secondly, sulfone compounds that generate sulfonic acid may be cited. Thirdly, halogen compounds that photogenerate hydrogen halides may be used. Fourthly, iron arene complexes may be cited.

In addition, the total used amount of polymerization initiator in the ink is preferably 0.01 to 35 mass % with respect to the total used amount of polymerizable compound, with 0.5 to 20 mass % being preferred, and 1.0 to 20 mass % being additionally desirable. If the amount is 0.01 mass % or greater, then the ink can be sufficiently cured. At 35 mass % or less, a cured film with a uniform degree of curing can be obtained.

When the sensitizing agent described below is used in the ink, the total used amount of the polymerization initiator is preferably such that the ratio of the polymerization initiator to the sensitizer (by mass) is 200:1 to 1:200, more preferably 50:1 to 1:50, even more preferably 20:1 to 1:5.

(b) Polymerizable Compound

Both the first ink 1 and the second ink 2 contain a polymerizable compound.

The polymerizable compound preferably has a molecular weight of 1000 or less, more preferably 50 to 800, even more preferably 60 to 500.

In addition, a monomer, oligomer, or polymer may be used without particular restrictions, provided that the polymerizable compound is a compound that cures through the excitation of a polymerization reaction such as radical polymerization, cationic polymerization, or anionic polymerization as a result of being provided with some kind of energy. However, it is particularly desirable to use various types of polymerizable compounds that are well known in their use as photopolymerizable compounds and which are made to undergo a polymerization reaction by the initiation types that are generated by the polymerization initiators described above.

In addition, preferred examples of the polymerizable compound are radical polymerizable compounds and cationic polymerizable compounds.

Radical Polymerizable Compound

There are no particular restrictions on radical polymerizable compounds, and well-known radical polymerizable compounds may be used. However, it is preferable for the compound to be an ethylenic unsaturated compound, more preferably a (meth)acrylate compound, (meth)acrylamide compound, N-vinyl compound, and/or vinyl ether compound, even more preferably, a (meth)acrylate compound and/or an N-vinyl compound. The term "(meth)acrylate" used herein denotes both acrylic and methacrylic compounds.

When using a radical polymerizable compound as the first ink 1, for the first ink 1, preferably of the total mass of the (b-1) polymerizable compound, the monofunctional radical polymerizable compound is 67 to 100 mass %, more preferably 70 to 100 mass %, and even more preferably 85 to 95 mass %. When within the aforementioned ranges, the printed layer 102 has good stretchability.

When using a radical polymerizable compound as the second ink 2, for the second ink 2, of the total mass of the (b-2) polymerizable compound, it is preferable that the multifunctional radical polymerizable compound be 55 to 100 mass %, more preferably 60 to 100 mass %, and even more preferably 80 to 100%, and especially preferably 100%, specifically, to have the (b-2) polymerizable compound be entirely a multifunctional radical polymerizable compound. When within the aforementioned ranges, the printed layer 102 is excellent in terms of, for example, impact resistance, wear resistance (abrasion resistance), scratch resistance, and solvent resistance. With this specification, the impact resistance, wear resistance (abrasion resistance), scratch resistance, and solvent resistance are sometimes collectively called "durability."

Also, it is acceptable for the radical polymerizable compound to be either monofunctional or multifunctional.

It is preferable for the monofunctional radical polymerizable compound to be the N-vinyl compound described below, with N-vinyl lactams being more preferred.

When a radical polymerizable compound is used as the (b-1) polymerizable compound in the first ink, the first ink preferably contains the N-vinyl compound described below, and more preferably contains an N-vinyl lactam.

The multifunctional radical polymerizable compound is preferably the multifunctional (meth)acrylate compound described below, where "(meth)acrylate" refers to both acrylates and methacrylates.

As the multifunctional polymerizable compound, it is preferable to use a combination of a bifunctional radical polymerizable compound and a radical polymerizable compound having a functionality of 3 or greater, and it is additionally desirable to combine a bifunctional radical polymerizable compound and a trifunctional radical polymerizable compound.

When using a radical polymerizable compound as the (b-2) polymerizable compound for the second ink 2, with the second ink 2, of the total mass of the (b-2) polymerizable compound, it is preferable that the bifunctional radical polymerizable compound be 30 to 100 mass %, more preferably 50 to 95 mass %, and even more preferably 70 to 90 mass %. Also, for the second ink 2, of the total mass of the (b-2) polymerizable compound, it is preferable that the trifunctional or higher radical polymerizable compound be included at 5 to 50 mass %, and more preferably included at 10 to 30 mass %. Furthermore, for the second ink 2, of the total mass of the (b-2) polymerizable compound, it is preferable that a trifunctional radical polymerizable compound be included at 5 to 50 mass %, and more preferably 10 to 30 mass %.

When using a radical polymerizable compound for the first ink 1, with the first ink 1, of the total mass of the first ink 1, it is preferable that the monofunctional radical polymerizable compound be 50 to 95 mass %, more preferably 55 to 90 mass %, and even more preferably 60 to 85 mass %. When within the aforementioned ranges, the printed layer 102 has good stretchability (flexibility).

When using a radical polymerizable compound for the second ink 2, with the second ink 2, of the total mass of the second ink 2, the multifunctional radical polymerizable compound is preferably 50 to 98 mass %, more preferably 55 to 95 mass %, and even more preferably 60 to 90 mass %. When within the aforementioned ranges, the printed layer 102 has excellent durability.

The monofunctional radical polymerizable compound and multifunctional radical polymerizable compound are described below.

Monofunctional Radical Polymerizable Monomer

A monofunctional radical polymerizable compound may be used as the radical polymerizable compound.

Preferred examples of monofunctional radical polymerizable monomers include monofunctional acrylate compounds, monofunctional methacrylates, monofunctional N-vinyl compounds, monofunctional acrylamide compounds, and monofunctional methacrylamide compounds. Monofunctional acrylate compounds, monofunctional methacrylate compounds, and monofunctional N-vinyl compound are more preferred examples.

When the first ink contains a monofunctional radical polymerizable monomer, the monofunctional radical polymerizable monomer is preferably a monofunctional acrylate compound and monofunctional N-vinyl compound used in conjunction, or a monofunctional methacrylate compound and a monofunctional N-vinyl compound used in conjunction, more preferably a monofunctional acrylate compound and a monofunctional N-vinyl compound used in conjunction.

It is preferable for the monofunctional radical polymerizable monomer to be a monomer having cyclic structures and only one ethylenic unsaturated double bond selected from the group consisting of an acryloyloxy group, methacryloyloxy group, acrylamide group, methacrylamide group, and N-vinyl group.

In addition, ethylenic unsaturated compounds may be cited as examples of suitable radical polymerizable monomers.

Preferred examples of monofunctional acrylates, monofunctional methacrylates, monofunctional vinyloxy compounds, monofunctional acrylamides, and monofunctional methacrylamides include monofunctional radical polymerizable monomers having groups with cyclic structures such as phenyl groups, naphthyl groups, anthracenyl groups, pyridinyl groups, tetrahydrofurfuryl groups, piperidinyl groups, cyclohexyl groups, cyclopentyl groups, cycloheptyl groups, isobornyl groups, and tricyclodecanyl groups.

Preferred examples of monofunctional radical polymerizable monomers include norbornyl(meth)acrylate, isoboronyl (meth)acrylate, cyclohexyl(meth)acrylate, cyclopentyl (meth)acrylate, cycloheptyl(meth)acrylate, cyclooctyl(meth) acrylate, cyclodecyl(meth)acrylate, dicyclodecyl(meth) acrylate, trimethylcyclohexyl(meth)acrylate, 4-t-butylcyclohexyl(meth)acrylate, acryloylmorpholine, 2-benzyl(meth)acrylate, phenoxyethyl(meth)acrylate, phenoxydiethyleneglycol(meth)acrylate, phenoxytriethyleneglycol(meth)acrylate, EO-modified cresol(meth)acrylate, tetrahydrofurfuryl(meth)acrylate, caprolactone-modified tetrahydrofurfuryl acrylate, nonylphenoxypolyethyleneglycol(meth)acrylate, neopentylglycol benzoate(meth)acrylate, paracumylphenoxyethyleneglycol(meth)acrylate, N-phthalimidoethyl(meth)acrylate, pentamethylpiperidyl(meth)acrylate, tetramethylpiperidyl(meth)acrylate, N-cyclohexyl acrylamide N-(1,1-dimethyl-2-phenyl)ethylacrylamide, N-diphenylmethylacrylamide, N-phthalimidomethylacrylamide, N-(1,1'-dimethyl-3-(1,2,4-triazol-1-yl)) propylacrylamide, and 5-(meth)acryloyloxymethyl-5-ethyl-1,3-dioxacyclohexane.

In addition, it is preferable to use a radical polymerizable monomer having N-vinyl groups and groups with cyclic structures as the monofunctional radical polymerizable monomer. Among these, it is preferable to use N-vinyl lactams such as N-vinylcarbazole, 1-vinylimidazole, and N-vinylcaprolactam, and it is even more desirable to use N-vinyl lactams.

With the first ink 1, it is preferable that the monofunctional cyclic polymerizable monomer having an N-vinyl group occupy 1 to 40 mass % of the entire first ink 1, more preferably occupy 10 to 35 mass %, and even more preferably occupy 12 to 30 mass %. Within the aforementioned ranges, inks are obtained which exhibit good copolymerization properties with other polymerizable compounds, and which have excellent curability and blocking resistance.

Also, with the first ink 1, it is preferable that the monofunctional N-vinyl lactams occupy 1 to 40 mass % of the entire first ink 1, more preferably occupy 10 to 35 mass %, and even more preferably occupy 12 to 30 mass %.

When the use volume of monofunctional N-vinyl lactams is within the numerical value range noted above, there is excellent curability, cured film flexibility, and adhesion to the cured film supports. Also, the N-vinyl lactams are compounds with relatively high fusing points. When the N-vinyl lactam content rate is 40 mass % or less, good solubility is shown at temperatures of 0° C. or less, and the temperature range at which the ink can be handled is broader, so this is desirable.

In addition, the acyclic monofunctional monomers described below may be used as the monofunctional radical polymerizable monomer. The acyclic monofunctional monomers have comparatively low viscosity and are used, for example, with the objective of decreasing the viscosity of the ink. However, from the perspective of suppressing tackiness of the cured film and giving high film strength for which scratches or the like will not occur during mold processing, it is preferable to be 20 mass % or lower. It is more preferable to be 15 mass % or lower.

Specific examples include octyl(meth)acrylate, 2-ethylhexyl(meth)acrylate, decyl(meth)acrylate, dodecyl(meth) acrylate, tridecyl(meth)acrylate, tetradecyl(meth)acrylate, hexadecyl(meth)acrylate, 2-hydroxyethyl(meth)acrylate, butoxyethyl(meth)acrylate, carbitol(meth)acrylate, 2-ethylhexyldiglycol(meth)acrylate, polyethyleneglycol(meth) acrylate monomethyl ether, polypropyleneglycol(meth)acrylate monomethyl ether, and polytetraethyleneglycol(meth) acrylate monomethyl ether.

Additional examples include (poly)ethyleneglycol mono (meth)acrylate, (poly)ethyleneglycol(meth)acrylate methyl ester, (poly)ethyleneglycol(meth)acrylate ethyl ester, (poly) ethyleneglycol(meth)acrylate phenyl ester, (poly)propyleneglycol mono(meth)acrylate, (poly)propyleneglycol mono (meth)acrylate phenyl ester, (poly)propyleneglycol(meth) acrylate methyl ester, (poly)propyleneglycol(meth)acrylate ethyl ester, 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, 2-hydroxyethyl acrylate, butoxyethyl acrylate, tetrahydrofurfuryl acrylate, benzyl acrylate, oligoester acrylate, N-methylol acrylamide, diacetone acrylamide, epoxy acrylate, methyl methacrylate, n-butyl methacrylate, 2-ethylhexyl methacrylate, n-octyl methacrylate, n-nonyl methacrylate, n-decyl methacrylate, isooctyl methacrylate, n-lauryl methacrylate, n-tridecyl methacrylate, n-cetyl methacrylate, n-stearyl methacrylate, alkyl methacrylate, glycidyl methacrylate, benzyl methacrylate, dimethyl aminomethyl methacrylate, and allyl glycidyl ether.

Additional examples include 2-ethylhexyl-diglycol acrylate, 2-hydroxy-3-phenoxypropyl acrylate, 2-hydroxybutyl acrylate, 2-acryloyloxyethyl phthalate, 2-acryloyloxyethyl-2-hydroxyethyl phthalate, ethoxyphenyl acrylate, 2-acryloyloxyethyl succinate, 2-acryloyloxyethyl hexahydrophthalate, lactone-modified plasticized acrylate, butoxyethyl acrylate, 2-hydroxyethyl acrylate, and methoxypropyleneglycol acrylate.

Multifunctional Radical Polymerizable Monomer

A multifunctional radical polymerizable monomer may be used as the radical polymerizable compound.

Preferred examples of the multifunctional radical polymer monomer include multifunctional polymerizable monomers having two or more groups having ethylenic unsaturated double bonds selected from the group consisting of acryloyloxy groups, methacryloyloxy groups, acrylamide groups, methacrylamide groups, vinyloxy groups, and N-vinyl groups. An ink having high cured film strength is obtained as a result of the inclusion of the multifunctional polymerizable monomer.

Examples of multifunctional radical polymerizable monomers having groups with radical polymerizable ethylenic unsaturated bonding include unsaturated carboxylic acids such as acrylic acid, methacrylic acid, itaconic acid, crotonic acid, isocrotonic acid, and maleic acid, and salts thereof, anhydrides having ethylenic unsaturated groups, acrylonitrile, styrene, various types of unsaturated polyesters, unsaturated polyethers, unsaturated polyamides, unsaturated urethane(meth)acrylic monomers or prepolymers, epoxy-based monomers and prepolymers, urethane-based monomers and prepolymers, and other (meth)acrylate esters, and compounds having two or more ethylenic unsaturated double bonds are preferred.

Specific examples include neopentyl glycol di(meth)acrylate, (poly)ethyleneglycol di(meth)acrylate, diethyleneglycol di(meth)acrylate, triethyleneglycol di(meth)acrylate, tetraethyleneglycol di(meth)acrylate, polypropyleneglycol di(meth)acrylate, (poly)tetramethyleneglycol di(meth)acrylate, bisphenol A propylene oxide (PO) di(meth)acrylate adduct, ethoxylated neopentylglycol di(meth)acrylate, propoxylated neopentylglycol di(meth)acrylate, bisphenol A ethylene oxide (EO) di(meth)acrylate adduct, EO-modified pentaerythritol tri(meth)acrylate, PO-modified pentaerythritol tri(meth)acrylate, EO-modified pentaerythritol tetra (meth)acrylate, PO-modified pentaerythritol tetra(meth) acrylate, EO-modified dipentaerythritol tetra(meth)acrylate, PO-modified dipentaerythritol tetra(meth)acrylate, EO-modified trimethylolpropane tri(meth)acrylate, PO-modified trimethylolpropane tri(meth)acrylate, EO-modified tetramethylolmethane tetra(meth)acrylate, PO-modified tetramethylolmethane tetra(meth)acrylate, pentaerythritol tri(meth)acrylate, pentaerythritol tetra(meth) acrylate, dipentaerythritol tetra(meth)acrylate, trimethylolpropane tri(meth)acrylate, tetramethylolmethane tetra(meth)acrylate, trimethylolethane tri(meth)acrylate, trimethylolpropane tri(meth)acrylate, bis(4-(meth)acryloxy-polyethoxyphenyl)propane, diallyl phthalate, triallyl trimellitate, 1,6-hexanediol di(meth)acrylate, 1,9-nonanediol di(meth)acrylate, 1,10-decanediol di(meth)acrylate, hydroxypivalic neopentylglycol di(meth)acrylate, tetramethylolmethane tri(meth)acrylate, dimethyloltricyclodecane di(meth)acrylate, modified glycerin tri(meth)acrylate, bisphenol A diglycidyl ether(meth)acrylic acid adduct, modified bisphenol A di(meth)acrylate, caprolactone-modified dipentaerythritol hexa(meth)acrylate, dipentaerythritol hexa (meth)acrylate, pentaerythritol tri(meth)acrylate tolylenediisocyanate urethane prepolymer, pentaerythritol tri(meth) acrylate hexamethylenediisocyanate urethane prepolymer, ditrimethylolpropane tetra(meth)acrylate, and pentaerythritol tri(meth)acrylate hexamethylenediisocyanate urethane prepolymer. More specifically, any well-known commercially-available or industrial radical polymerizing or crosslinking monomer, oligomer or polymer may be used, as described in "Cross Linking Agent Handbook" by Shinzo Yamashita (Taiseisha, 1981), UV, EB Curing Handbook: Ed. by Kiyomi Kato (Kobunshi Kanko-Kai, 1985), "Applications and Market of UV, EB Curing Technology", page 79, by Radtech Laboratory (CMA, 1989), and "Polyester Resin Handbook" by Eiichiro Takiyama (Japan Daily Industrial News, 1988).

Among these, the following are preferred examples of multifunctional radical polymerizable monomers.

Examples of preferred bifunctional radical polymerizable monomers are ethyleneglycol di(meth)acrylate, diethyleneglycol di(meth)acrylate, triethyleneglycol di(meth)acrylate, tetraethyleneglycol di(meth)acrylate, polyethyleneglycol di(meth)acrylate, propyleneglycol di(meth)acrylate, dipropyleneglycol di(meth)acrylate, tripropyleneglycol di(meth) acrylate, tetrapropyleneglycol di(meth)acrylate, polypropyleneglycol di(meth)acrylate, ethoxylated neopentylglycol diacrylate, and propoxylated neopentylglycol diacrylate.

In addition, it is preferable to use a vinyl ether compound as the radical polymerizable compound.

The monomers that are cited as examples of the radical polymerizable compound described above have high reactivity, low viscosity, and superior binding with respect to supports.

Cation Polymerizable Compounds

From the standpoint of curing properties and scratch resistance, it is desirable to use oxetane ring compounds and oxirane ring compounds as the cationic polymerizable compound, and modes that contain both an oxetane ring compound and oxirane ring compound are more preferred.

The oxirane ring compound ("oxirane compound" below) referred to herein is a compound that contains at least one oxirane ring (oxiranyl group, epoxy group), specifically, which may be suitably selected from among materials that are commonly used as epoxy resins, examples of which include conventional well-known aromatic epoxy resins, alicyclic epoxy resins, and aliphatic epoxy resins. The material may be a monomer, oligomer, or polymer.

In addition, the term "oxetane ring compound" ("oxetane compound" below) refers to a compound containing at least one oxetane ring (oxetanyl group) in its molecules.

When using a cationic polymerizable compound for the first ink 1, with the first ink 1, of the total mass of the (b-1) polymerizable compound, it is preferable that the monofunctional cationic polymerizable compound be 65 to 95 mass %, more preferably 65 to 85 mass %, and even more preferably 65 to 75 mass %. When within the aforementioned ranges, the printed layer 102 has good stretchability.

When using a cationic polymerizable compound for the second ink 2, with the second ink 2, of the total mass of the (b-2) polymerizable compound, it is preferable that the multifunctional cationic polymerizable compound be 50 to 90 mass %, more preferably 52 to 75 mass %, and even more preferably 55 to 65 mass %. When within the aforementioned ranges, the printed layer 102 has excellent durability.

It is acceptable for the cationic polymerizable compound to be monofunctional or multifunctional.

The monofunctional cationic polymerizable compound is preferably a monofunctional oxirane compound and/or a monofunctional oxetane compound.

Preferred examples of multifunctional cationic polymerizable compounds are bifunctional cationic polymerizable compounds. In addition, a multifunctional oxirane compound and/or multifunctional oxetane compound are preferred as the multifunctional radical polymerizable compound, and it is additionally desirable to use a multifunctional oxirane compound and multifunctional oxetane compound in conjunction.

When using a cationic polymerizable compound for the first ink 1, with the first ink 1, of the total mass of the first ink 1, it is preferable that the monofunctional cationic polymerizable compound be 40 to 95 mass %, more preferable that it be 45 to 80 mass %, and even more preferable that it be 45 to 65 mass %. When within the aforementioned ranges, the printed layer 102 has good stretchability.

When using a cationic polymerizable compound for the second ink 2, with the second ink 2, of the total mass of the second ink 2, it is preferable that the multifunctional cationic polymerizable compound be 35 to 90 mass %, more preferable that it be 38 to 75 mass %, and even more preferable that it be 40 to 60 mass %. When within the aforementioned ranges, the printed layer 102 has excellent durability.

The monofunctional cationic polymerizable compound and the multifunctional cationic polymerizable compound are described in detail below.

Examples of the cationic polymerizable compound include the epoxy compounds, vinyl ether compounds, and oxetane compounds described in the publications JP (Kokai) 6-9714, JP (Kokai) 2001-31892, 2001-40068, 2001-55507, 2001-310938, 2001-310937, and 2001-220526.

Examples of monofunctional epoxy compounds include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethyl cyclohexene oxide, 3-acryloyloxymethyl cyclohexane oxide, and 3-vinylcyclohexene oxide.

In addition, examples of multifunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexyl methyl-3',4'-epoxycyclohexane carboxylate, 2-(3,4-epoxycyclohexyl)-7,8-epoxy-1,3-dioxaspiro[5.5]undecane, bis(3,4-epoxycyclohexylmethyl)adipate, vinylcyclohexene oxide, 4-vinylepoxycylcohexane, bis(3,4-epoxy-6-methylcyclohexylmethyl)adipate, 3,4-epoxY-6-methylcyclohexyl-3',4'-epoxY-6'-methylcyclohexanecarboxylate, methylenebis(3,4-epoxycyclohexane), dicyclopentadiene diepoxide, ethyleneglycol di(3,4-epoxycyclohexylmethyl)ether, ethylenebis(3,4-epoxycyclohexane carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ether, 1,13-tetradecadiene dioxide, limonene dioxide, 1,2,7,8-diepoxyoctane, and 1,2,5,6-diepoxycyclooctane.

Among these epoxy compounds, aromatic epoxides and alicyclic epoxides are preferred from the standpoint of superior curing speed, and alicyclic epoxides are particularly preferred.

Examples of monofunctional oxetane compounds include 3-ethyl-3-hydroxymethyloxetane, 3-(meth)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl) ether, isobornyloxyethyl(3-ethyl-3-oxetanylmethyl) ether, isobornyl(3-ethyl-3-oxetanylmethyl) ether, 2-ethylhexyl(3-ethyl-3-oxetanylmethyl)ether, ethyldiethyleneglycol(3-ethyl-3-oxetanylmethyl)ether, dicyclopentadiene(3-ethyl-3-oxetanylmethyl)ether, dicyclopentenyloxyethyl(3-ethyl-3-oxetanylmethyl) ether, dicyclopentenyl(3-ethyl-3-oxetanylmethyl) ether, tetrahydrofurfuryl(3-ethyl-3-oxetanylmethyl) ether, tetrabromophenyl(3-ethyl-3-oxetanylmethyl) ether, 2-tetrabromophenoxyethyl(3-ethyl-3-oxetanylmethyl) ether, tribromophenyl(3-ethyl-3-oxetanylmethyl) ether, 2-tribromophenoxyethyl(3-ethyl-3-oxetanylmethyl) ether, 2-hydroxyethyl(3-ethyl-3-oxetanylmethyl) ether, 2-hydroxypropyl(3-ethyl-3-oxetanylmethyl) ether, butoxyethyl(3-ethyl-3-oxetanylmethyl) ether, pentachlorophenyl(3-ethyl-3-oxetanylmethyl) ether, pentabromophenyl(3-ethyl-3-oxetanylmethyl) ether, and bornyl(3-ethyl-3-oxetanylmethyl) ether.

Examples of multifunctional oxetane compounds include 3,7-bis(3-oxetanyl)-5-oxanonane, 3,3'-(1,3-(2-methylenyl)propanediylbis(oxymethylene))bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenylbis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene(3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, EO-modified bisphenol A bis(3-ethyl-3-oxetanylmethyl)ether, PO-modified bisphenol A bis(3-ethyl-3-oxetanylmethyl)ether, EO-modified hydrogenated bisphenol A bis(3-ethyl-3-oxetanylmethyl)ether, PO-modified hydrogenated bisphenol A bis(3-ethyl-3-oxetanylmethyl)ether, and EO-modified bisphenol F (3-ethyl-3-oxetanylmethyl)ether, and other multifunctional oxetanes.

These cationic polymerizable compounds may be used individually, or two or more types may be used in conjunction.

Also, for the total mass of the polymerizable compound in the ink, in relation to the total mass of ink, it is preferable to be 55 to 95 mass %, and more preferably 60 to 90 mass %. When within the aforementioned ranges, the curability is excellent, and the viscosity is at an appropriate level.

In addition, there are no particular restrictions on the polymerizable compound production method, and the compounds may be synthesized by well-known methods. In addition, commercially-available products may be used, when available.

(c) Colorant

The first ink 1 contains a pigment as a colorant. The pigment has excellent weatherability and color reproducibility. For pigments (colorants) that are suitable for use in inks, it is preferable to select compounds that do not function as polymerization inhibitors in the polymerization reaction which occurs as the curing reaction so as not to reduce the sensitivity of the curing reaction to the activating radiation.

There are no particular restrictions on pigments, and the organic and inorganic pigments of the following numbers described in the color index, for example, may be used.

Examples of red or magenta pigments include Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36.

Examples of blue or cyan pigments include Pigment Blue 1, 15, 15:1, 15:2, 15:3, 15:4, 15:6, 16, 17-1, 22, 27, 28, 29, 36, or 60.

Examples of green pigments include Pigment Green 7, 26, 36, or 50.

Examples of yellow pigments include Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193.

Examples of black pigments include Pigment Black 7, 28, or 26.

Examples of white pigments include Pigment White 6, 18, or 21, and all of the above may be used in accordance with objectives.

In addition, after adding the colorant to the ink, it is preferable for the colorant to be dispersed to a suitable degree within the ink. Dispersion of the colorant may be carried out using various types of dispersion devices, such as a ball mill, a sand mill, an attritor, a roll mill, an agitator, a Henschel mixer, a colloidal mill, an ultrasonic homogenizer, a pearl mill, a wet type jet mill, or a paint shaker.

The colorant, when preparing the ink, may be blended by direct addition along with the respective components, but to improve dispersibility, the colorant may be added to a dispersion medium such as a solvent or radical polymerizable compound in advance, uniformly dispersed and dissolved therein, and then blended.

(d) Dispersant

The ink preferably contains dispersant in order that the pigment is stably dispersed in the ink.

High-polymer dispersants are preferred as the dispersant, where the term "high-polymer dispersant" refers to a dispersant with a mass-average molecular weight of 1,000 or greater.

Examples of high-polymer dispersants include high-polymer dispersants such as DisperBYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174, and DisperBYK-182 (all manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (all manufactured by EFKA Additives), and Disperse Aid 6, Disperse Aid 8, Disperse Aid 15, and Disperse Aid 9100 (manufactured by San Nopco Limited); various types of Solsperse dispersants such as Solsperse 3000, 5000, 9000, 12000, 13240, 13940, 17000, 22000, 24000, 26000, 28000, 32000, 36000, 39000, 41000, and 71000 (manufactured by Avecia); Adeka Pluronic L31, F38, L42, L44, L61, L64, F68, L72, P95, F77, P84, F87, P94, L101, P103, F108, L121, and P-123 (manufactured by Adeka Corporation), Isonet S-20 (manufactured by Sanyo Chemical Industries, Ltd.), and Disparlon KS-860, 873SN, and 874 (polymerizable dispersant), #2150 (aliphatic poly carboxylic acid), and #7004 (polyether ester type), manufactured by Kusumoto Chemicals, Ltd.

The content of dispersant in the ink is suitably selected in accordance with the objectives of use, but is preferably 0.05 to 15 mass % with respect to the total mass of the ink.

(e) Other Components

Components other than those components described above may be added, as necessary, to the ink.

Examples of other components include sensitizers, co-sensitizers, surfactants, ultraviolet absorbers, antioxidants, antifade agents, conductive salts, solvents, high-polymer compounds, and basic compounds.

In addition, leveling additives, matting agents, waxes for adjusting film properties, and tackifiers that do not inhibit polymerization and are added in order to improve adhesion with respect to supports such as a polyolefin or PET may be added as necessary.

Specific examples of tackifiers include the high-molecular-weight tacky polymers described on pp. 5 to 6 of JP (Kokai) 2001-49200 (e.g., esters of alcohols having alkyl groups with carbon numbers of 1 to 20 and (meth)acrylic acid, esters of alicyclic alcohols with carbon numbers of 3 to 14 and (meth) acrylic acid, and copolymers formed from esters of aromatic alcohols with carbon numbers of 6 to 14 and (meth)acrylic acid), and low-molecular-weight tackifying resins having polymerizable unsaturated bonds.

The first ink 1 and the second ink 2 containing elements as described above have mutually different characteristics after curing.

The first ink 1, when the first ink 1 is cured and made into a film 1' of thickness $t_1$ of 5 μm, has a characteristic of stretching by 70% or greater when the film 1' is stretched in an environment of 150° C. (see FIGS. 5A to 5D). Following, this characteristic is called the "first characteristic." Meanwhile, the second ink 2, has a characteristic for which the glass transition point $Tg_2$ of the second cured substance for which the second ink 2 was cured is higher than the glass transition point $Tg_1$ of the first cured substance for which the first ink 1 was cured. Following, this characteristic is called the "second characteristic." When the first cured substance (film 1') is compared to the second cured substance, the first cured substance has superior stretchability and higher elasticity than the second cured substance.

The first characteristic, specifically, the film 1' degree of stretching (stretchability) is defined as follows.

Figure 5A:
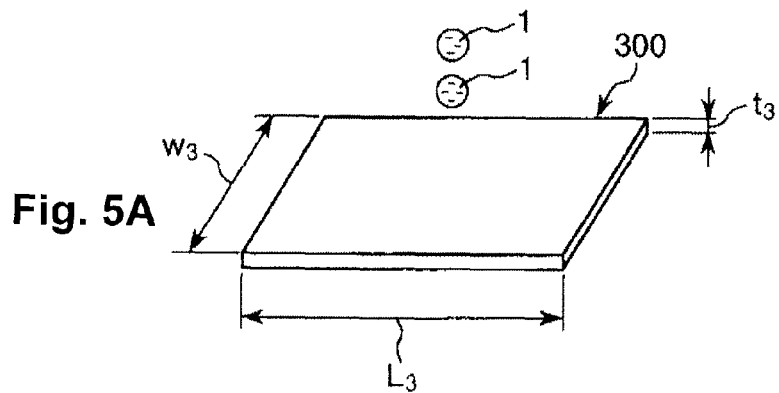
FIGS. 5A to 5D are perspective views for explaining the characteristics of the first ink.

As shown in FIG. 5A, a base material 300 made of resin forming a plate shape of length $L_3$, thickness $t_3$, and width $w_3$ is prepared. As the resin material constituting the base material 300, examples include various types of thermoplastic elastomer such as polyethylene terephthalate (PET), polycarbonate and the like.

Then, a first ink 1 is placed on the base material 300 using the inkjet method.

Figure 5B:
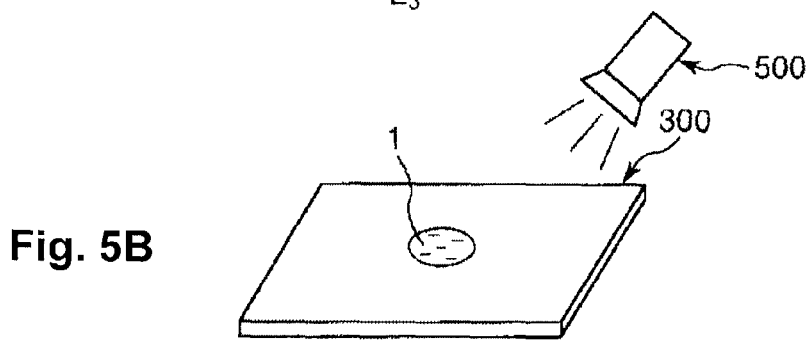

Next, as shown in FIG. 5B, ultraviolet rays are radiated from the ultraviolet ray radiation device 500 on the first ink 1 on the base material 300. The peak wavelength of the ultraviolet rays at this time is approximately 390 nm, and the ultraviolet ray radiation time is 0.05 to 5 sec.

Figure 5C:
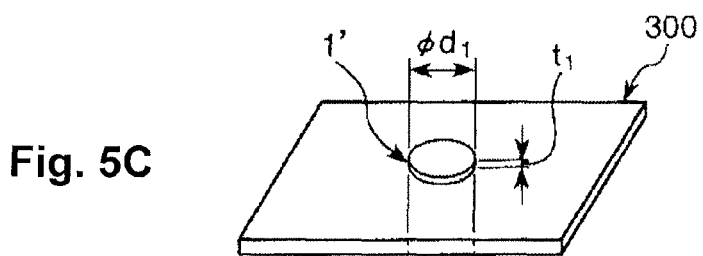

By doing this, as shown in FIG. 5C, the film 1' made by curing the first ink 1 is formed on the base material 300. This film 1' forms almost a circle of diameter $\varnothing d_1$ in plan view. Also, the thickness $t_1$ of the film 1' is 5 μm.

Figure 5D:
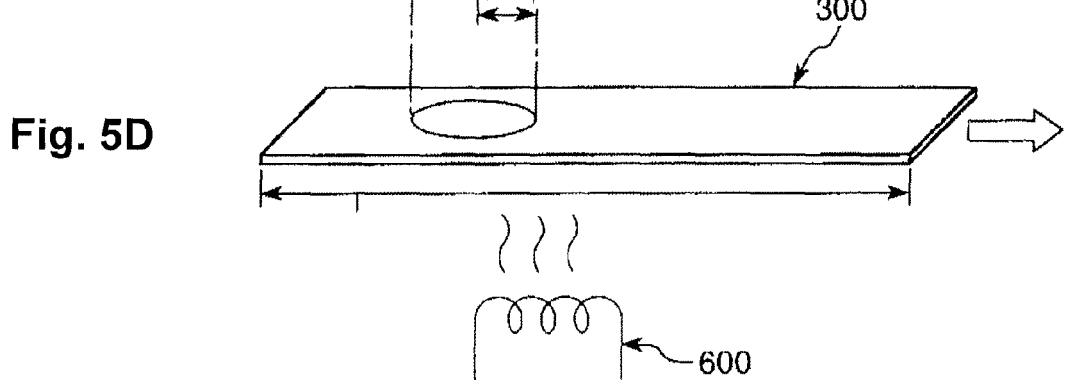

Next, as shown in FIG. 5D, the base material 300 on which the film 1' is formed is housed inside a chamber (not illustrated) for example, that chamber interior is heated to 150° C. by an electric heater 500, and that state is maintained.

Then, the base material 300 is pulled until its entire length reaches 2L. The pulling speed at this time is 1.0 mm/sec.

Also, the film 1' follows the pulling deformation of the base material 300, and is stretched in the same direction as that base material 300. The stretch volume at this time (stretch length) is $\Delta d_1$.

The degree of stretching is defined as $(\Delta d_1/d) \times 100$, and the value of this is 70% or greater.

With the second characteristic, the glass transition point $Tg_2$ is higher than the glass transition point $Tg_1$, and in this case, it is preferable that the glass transition point $Tg_1$ be less than 100° C., and the glass transition point $Tg_2$ be 100° C. or greater, and more preferable that the glass transition point $Tg_1$ be 50 to 90° C., and the glass transition point $Tg_2$ be 100 to 150° C.

Also, the difference between the glass transition point $Tg_1$ and the glass transition point $Tg_2$ ($Tg_2-Tg_1$) is preferably 300° C. or less, more preferably 10 to 200° C., and even more preferably 50 to 100° C.

As an adjustment of the glass transition points $Tg_1$ and $Tg_2$, for example, it is possible to perform this by adjusting the wavelength and radiation time of the ultraviolet rays radiated when curing the ink.

The first ink 1 and second ink 2 having the kinds of characteristics noted above are coated on part or all of the base material 101 when manufacturing the printed material 100. At this time, the first ink 1 and the second ink 2 are coated so as to be overlapped and have a portion mixed (see FIG. 9 to FIG. 15). After that, the inks on the base material 101 (first ink 1 and second ink 2) are radiated with ultraviolet rays from the ultraviolet ray radiating means 12a and 12b and cured. As a result, the printing layer 102 is formed. Then, as will be described later, the occurrence of cracking and peeling on the printing layer 102 are reliably prevented, and the printing layer 102 has good durability.

As shown in FIG. 7, with the first glass transition point $Tg_1$ of the first cured substance for which the first ink 1 was cured and the second glass transition point $Tg_2$ of the second cured substance for which the second ink 2 was cured, the second glass transition point $Tg_2$ is higher than the first glass transition point $Tg_1$. As an adjustment for each glass transition point, for example, it is possible to perform adjustment of the wavelength of the radiated ultraviolet ray or radiation time when curing the ink.

For example, when the molded article 200 made by processing the printed material 100 is used as the speedometer panel of an automobile, the use environment temperature depends on the country or region, but normally this is thought to be from −40 to 100° C. In this case, it is preferable that the first glass transition point $Tg_1$ be set to less than the upper limit value of the use environment temperature in which the molded article 200 (printed material 100) is used, specifically, less than 100° C., and that the second glass transition point $Tg_2$ be set to the upper limit value or greater, specifically, set to 100° C. or greater, and it is more preferable that the first glass transition point $Tg_1$ be set to 50 to 90° C., and the second glass transition point $Tg_2$ be set to 100 to 150° C.

Also, the difference between the first glass transition point $Tg_1$ and the second glass transition point $Tg_2$ ($Tg_2-Tg_1$) is preferably 300° C. or less, more preferably 10 to 200° C., and even more preferably 50 to 100° C.

When the first cured substance and second cured substance having glass transition points like those above are compared, the first cured substance has superior stretchability to that of the second cured substance, and it is possible to easily and reliably follow the deformation of the base material 101 when molding the molded article 200. Meanwhile, the second cured substance has superior durability to that of the first cured substance, and the occurrence of peeling and the like when molding the molded article 200 is prevented.

Then, this kind of first ink which becomes the first cured substance and the second ink which becomes the second cured substance are coated on part or all of the base material 101 when manufacturing the printed material 100. At this time, the first ink 1 and the second ink 2 are coated so as to be overlapped and partially mixed, and also receive ultraviolet rays from the ultraviolet ray radiation means 12a and 12b to be cured. As a result, the printed layer 102 is formed. As will be described later, this printed layer 102 has properties between those of the first cured substance and the second cured substance, resulting in an item for which the occurrence of cracking and peeling and the like are reliably prevented, and which has good durability.

As described previously, because the second ink 2 is essentially colorless and transparent, even if the first ink 1 and the second ink 2 are mixed, it is possible to suppress or prevent a change in color on the original color of the first ink 1.

Figure 11:
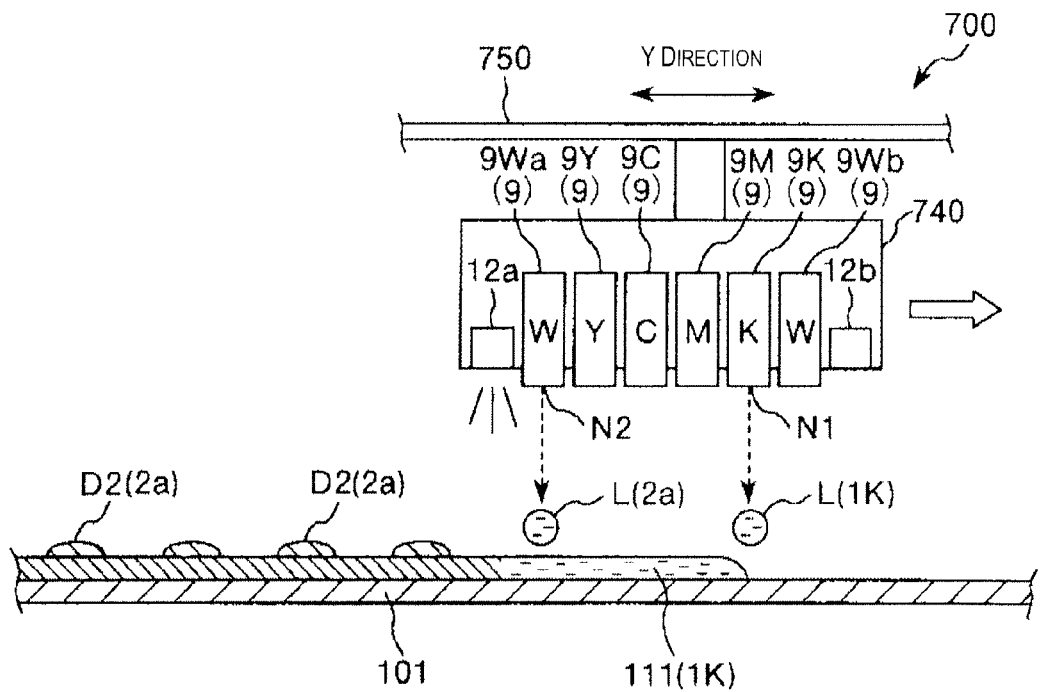
FIG. 11 is a partial cross section view showing the sequence of steps for manufacturing the printed material of the present invention, as well as manufacturing a molded article thereafter.
Figure 14:
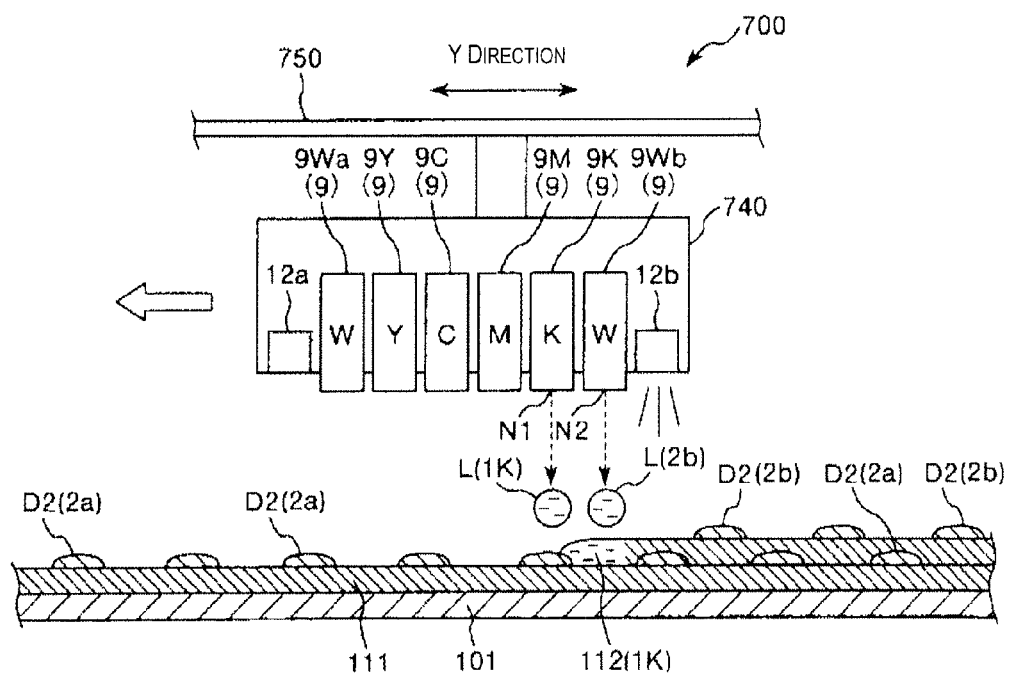
FIG. 14 is a partial cross section view showing the sequence of steps for manufacturing the printed material of the present invention, as well as manufacturing a molded article thereafter.

It is also possible to do collective curing of the first ink 1 and the second ink 2 with ultraviolet rays of the same peak wavelength (see FIG. 11 and FIG. 14). The ultraviolet ray peak wavelength is not particularly restricted, but for example it is preferably 350 nm or greater and 450 nm or less, and more preferably 380 nm or greater and 420 nm or less.

In contrast to this, when the peak wavelength for curing the first ink 1 and the peak wavelength for curing the second ink 2, specifically, the curing wavelength regions are different, ultraviolet rays of each peak wavelength must be radiated. However, by making it possible to use ultraviolet rays of the same peak wavelength, it is possible to easily and quickly perform the steps for forming the printed layer 102 by curing the first ink 1 and the second ink 2 when manufacturing the printed material 100.

To cure the first ink 1 and the second ink 2 with ultraviolet rays of the same peak wavelength, for example, there are methods such as including in each ink respectively the same type (common) of polymerization initiator.

Also, it is preferable that the first ink 1 and the second ink 2 respectively have a viscosity around 25 degrees which is normal temperature be 1 mPa·s or greater and 1000 mPa·s or less, and more preferably 1 mPa·s or greater and 50 mPa·s or less. Furthermore, when the droplet discharge head 9 is heated to 40° C. for use, when the viscosity of the first ink 1 at 40° C. or less is $\mu_1$ and the viscosity of the second ink 2 at 40° C. or less is $\mu_2$, it is preferable that the equation $((\mu_1-\mu_2)\times 100=\pm10(\%))$ be satisfied.

When within the ranges noted above, when the first ink 1 and the second ink 2 are respectively sprayed using the inkjet method, that spraying is performed with stability.

Also, the first ink 1 and the second ink 2 preferably respectively have surface tension around 25 degrees which is normal temperature be 5 mN/m or greater and 200 mN/m or less, and more preferably 10 mN/m or greater and 40 mN/m or less. Furthermore, when the droplet discharge head 9 is heated to 40° C. for use, when the surface tension of the first ink 1 at 40° C. is $f_1$, and the surface tension of the second ink 2 at 40° C. is $f_2$, it is preferable that the equation $((f_1-f_2)/f_1)\times 100=\pm10(\%)$ be satisfied.

When within the ranges noted above, when the first ink 1 and the second ink 2 are respectively sprayed using the inkjet method, that spraying is performed with stability. Also, it is possible to have the wet spreading action of the first ink 1 and the second ink 2 on the base material 101 exhibit the same behavior, for each ink to spread evenly, and to prevent the occurrence of color unevenness on one printed layer 102.

As an adjustment for the ink viscosity and the surface tension, it is possible to perform this for example by adjusting the content volume of additives such as surfactants or the like.

Next, we will describe the printing device 700 in which the ink set 10 is loaded.

Printing Device

As shown in FIG. 9 to FIG. 16, with the printing device 700 in the loaded state, after spraying ultraviolet ray curing ink (first ink 1 and second ink 2), ultraviolet ray radiation is performed on the sprayed ultraviolet ray curing ink to cure this ultraviolet ray curing ink, and letters, numbers, and various types of designs and the like are rendered on the base material 101.

As shown in FIG. 1 to FIG. 3, the printing device 700 is equipped with a base stand 720 on which the base material 101 is placed, a transport device 730 for transporting the base material 101 on the base stand 720 in the X direction in FIG. 1, droplet discharge heads 9 that spray ink, a carriage 740 that supports the droplet discharge heads 9, and a conveyance device 750 that moves the carriage 740 in the Y direction orthogonal to the X direction. With this embodiment, a movement device (movement means) that moves the base material 101 and the carriage 740 (droplet discharge head 9) relative to each other (moves them back and forth) in the X direction and Y direction is constituted by the transport device 730 and the conveyance device 750.

Also, as shown in FIG. 16, the printing device 700 has a heating device 790 for heating the printed layer 102 for each base material 101. This heating device 790 has a chamber (not illustrated) and a pair of electric heaters 791 installed within that chamber.

The transport device 730 has a configuration that comprises a work stage 760 and a stage movement device 770 that are provided on the base stand 720. The work stage 760 is provided so that it can move in the X-direction on the base stand 720 by the stage movement device 770, and in the production steps, the base material 101 that is transported from the transport device (not shown) that is arranged upstream from the printing device 700 is held on the XY plane by a vacuum chucking mechanism, for example. The stage movement device 770 is provided with a mechanism such as a ball screw or linear guide and has a configuration whereby it moves the work stage 760 in the X-direction based on a stage position control signal that represents the X-coordinate of the work stage 760 input from a control device 780.

The conveyance device 750 that moves the carriage 740 is equipped with a ball screw or linear guide mechanism that is a bridge device that extends across the base stand 720, for example, in relation to the Z direction orthogonal to the Y direction and the XY plane. Based on this kind of structure, the conveyance device 750, based on the carriage position control signals input from the control device 780, which indicate the carriage 740Y coordinate and Z coordinate, moves the carriage 740 in the Y direction, and also moves it in the Z direction.

As shown in FIG. 2 and FIG. 3, the carriage 740 has the form of a square plate and is movably attached to the conveyance device 750. A plurality (6 in this embodiment) of droplet discharge heads 9 (9Y, 9C, 9M, 9K, 9Wa, 9Wb) are retained on the bottom surface 741 in a state whereby they are aligned in the Y-direction. Then, with this embodiment, the droplet discharge heads 9Wa, 9Y, 9C, 9M, 9K, and 9Wb are arranged in sequence from the left side in FIG. 2 and FIG. 3.

The plurality of droplet discharge heads 9 (9Y, 9C, 9M, 9K, 9Wa, 9Wb) described below are provided with a large number (plurality of) nozzles N (first nozzle N1, second nozzle N2), and thus ink droplets L of each nozzle N are sprayed based on the graphic data and the drive control signal that are input from the control device 780. The droplet discharge head 9Y sprays first ink 1Y corresponding to Y (yellow), the droplet discharge head 9C sprays first ink 1C corresponding to C (cyan), the droplet discharge head 9M sprays first ink 1M corresponding to M (magenta), the droplet discharge head 9K sprays first ink 1K corresponding to K (black), the droplet discharge head 9Wa sprays second ink 2a corresponding to transparent color (W), and the droplet discharge head 9Wb sprays second ink 2b corresponding to transparent color (W).

A tank 11Y for loading and storing the first ink 1Y for Y (yellow) is connected to the droplet discharge head 9Y corresponding to Y (yellow) via a tube 710. As a result, first ink 1Y for Y (yellow) is supplied from the tank 11Y to the droplet discharge head 9Y. This supplied first ink 1Y is respectively sprayed as droplets L from the plurality of first nozzles N1 provided on the bottom surface of the droplet discharge head 9Y.

Similarly, a tank 11C for loading and storing the first ink 1C for C (cyan) is connected to the droplet discharge head 9C corresponding to C (cyan) via a tube 710. As a result, first ink 1C for C (cyan) is supplied from the tank 11C to the droplet discharge head 9C. This supplied first ink 1C is respectively sprayed as droplets L from the plurality of first nozzles N1 provided on the bottom surface of the droplet discharge head 9C.

Also, a tank 11M for loading and storing the first ink 1M for M (magenta) is connected to the droplet discharge head 9M corresponding to M (magenta) via a tube 710. As a result, first ink 1M for M (magenta) is supplied from the tank 11M to the droplet discharge head 9M. This supplied first ink 1M is respectively sprayed as droplets L from the plurality of first nozzles N1 provided on the bottom surface of the droplet discharge head 9M.

Also, a tank 11K for loading and storing the first ink 1K for K (black) is connected to the droplet discharge head 9K corresponding to K (black) via a tube 710. As a result, first ink 1K for K (black) is supplied from the tank 11K to the droplet discharge head 9K. This supplied first ink 1K is respectively sprayed as droplets L from the plurality of first nozzles N1 provided on the bottom surface of the droplet discharge head 9K.

Also, a tank 11Wa for loading and storing the second ink 2a for W (transparent) is connected to the droplet discharge head 9Wa corresponding to W (transparent) via a tube 710. As a result, second ink 2a for W (transparent) is supplied from the tank 11Wa to the droplet discharge head 9Wa. This supplied second ink 2a is respectively sprayed as droplets L from the plurality of second nozzles N2 provided on the bottom surface of the droplet discharge head 9Wa.

Also, a tank 11Wb for loading and storing the second ink 2b for W (transparent) is connected to the droplet discharge head 9Wb corresponding to W (transparent) via a tube 710. As a result, second ink 2b for W (transparent) is supplied from the tank 11Wb to the droplet discharge head 9Wb. This supplied second ink 2b is respectively sprayed as droplets L from the plurality of second nozzles N2 provided on the bottom surface of the droplet discharge head 9Wb.

As described previously, the droplet discharge heads 9Wa, 9Y, 9C, 9M, 9K, and 9Wb are arranged in this order along the Y direction. As a result, the first nozzles N1 corresponding to each color are arranged along the Y direction, and the second nozzles N2 are respectively arranged at both sides along the arrangement direction of the first nozzles N1.

With this kind of arrangement, as shown in FIG. 9 to FIG. 15, when the droplet discharge heads 9Wa, 9Y, 9C, 9M, 9K, and 9Wb progress along the Y direction, specifically, they do the forward and return movement, on the forward path, the first ink 1K is sprayed from the first nozzle N1 of the droplet discharge head 9K on the base material 101, and subsequently, it is possible to spray the second ink 2a from the second nozzle N2 of the droplet discharge head 9Wa positioned further to the rear of the progress direction than the droplet discharge head 9K. Also, with the return path as well, it is possible to have the first ink 1K sprayed from the first nozzle N1 of the droplet discharge head 9K on the base material 101, and subsequently, to spray the second ink 2b from the second nozzle N2 of the droplet discharge head 9Wb positioned further to the rear of the progress direction than the droplet discharge head 9K.

In this way, with the printing device 700, with progress in one direction, specifically with either the forward path or the return path, it is possible to reliably spray the colored first ink 1 before the colorless transparent second ink 2. As a result, it is possible to make a constant time from when the first ink 1 and the second ink 2 are overlaid on the base material 101 until these inks are cured by the ultraviolet ray radiation means 12a or 12b. It is also possible to make the continuous contact time of the second ink 2 with the first ink 1 remaining in a liquid form as short as possible.

Figure 4A:
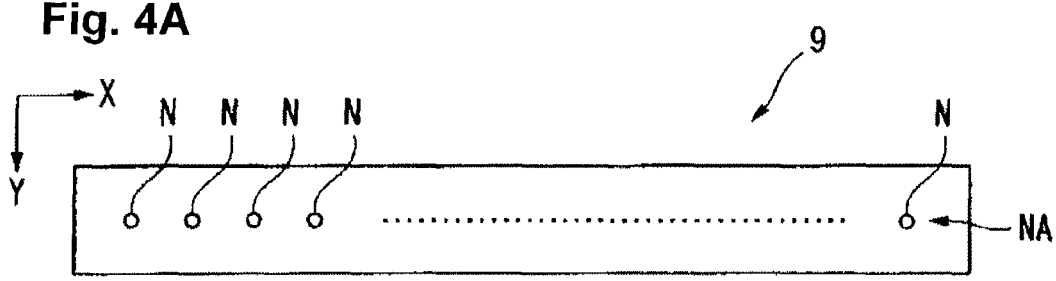
FIGS. 4A to 4C are drawings showing the schematic structure of the droplet discharge head of the printing device shown in FIG. 1.
Figure 4B:
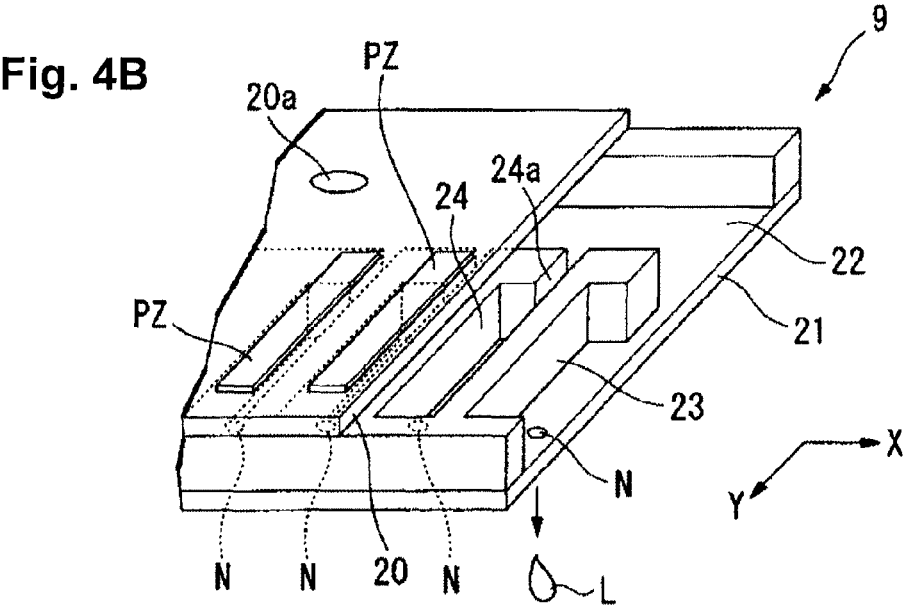
Figure 4C:
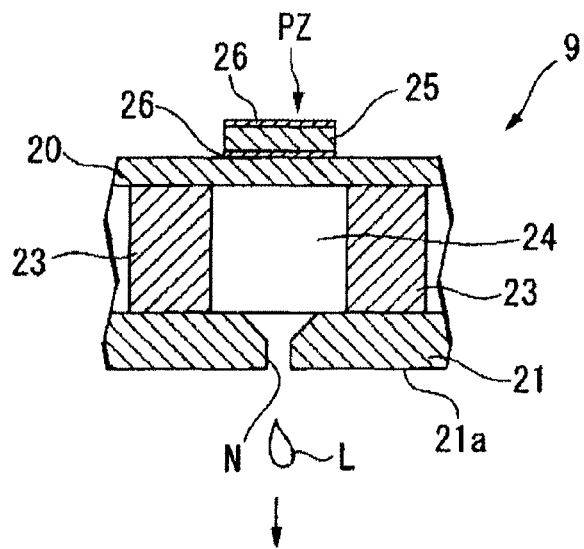

Next, we will describe the internal structure of the droplet discharge heads 9 (9Y, 9C, 9M, 9K, 9Wa, 9Wb) based on FIGS. 4A to 4C. Specifically, the internal structures of the droplet discharge heads 9Y, 9C, 9M, 9K, 9Wa, and 9Wb are respectively the same.

FIGS. 4A to 4C are schematic configuration diagrams of the droplet discharge head 9. FIG. 4A is a plan view of the droplet discharge head 9 as seen from the side of the work stage 760, FIG. 4B is a partial perspective view of the droplet discharge head 9, and FIG. 4C is a partial sectional view showing one nozzle of the droplet discharge head 9.

As shown in FIG. 4A, the droplet discharge head 9 has a plurality (e.g., 180) nozzles N that are aligned in a direction that is perpendicular to the Y direction, specifically, the X-direction in this embodiment, thereby forming a plurality of nozzle rows NA from the plurality of nozzles N. In the drawing, one row of nozzles is shown, but the number of nozzles rows and number of nozzles provided on the droplet discharge head 9 can be changed as desired. For example, a plurality of nozzle rows NA that are aligned in the X direction may be provided in the Y direction.

In addition, as shown in FIG. 4B, a configuration is used that comprises a vibration plate 20 that is provided with a material supply hole 20*a* that is connected to the tube 710, a nozzle plate 21 on which the nozzles N are provided, a reservoir (liquid reservoir) 22 that is provided between the vibration plate 20 and the nozzle pate 21, a plurality of partitioning walls 23, and a plurality of cavities (liquid chambers) 24. The surface (bottom surface) of the nozzle plate 21 constitutes a nozzle surface 21*a* on which the plurality of nozzles N are formed. A piezoelectric element (drive element) PZ is arranged opposite each nozzle N on the vibration plate 20. The piezoelectric element PZ comprises, for example, a piezo element.

Ink that is supplied via the material supply hole 20*a* fills the reservoir 22. The cavities 24 are formed so that the vibration plates 20 and the nozzle plates 21 are surrounded by pairs of partitioning walls 23 and are provided in a one-to-one correspondence with the nozzles N. In addition, ink is introduced into each of the cavities 24 from the reservoir 22 via the supply openings 24*a* that are provided between the pairs of partitioning walls 23.

In addition, as shown in FIG. 4C, the piezoelectric element PZ has a configuration in which a piezoelectric material 25 is sandwiched by a pair of electrodes 26, and the piezoelectric material 25 is made to contract by applying drive signals to the pair of electrodes 26. Therefore, the vibration plate 20 on which the piezoelectric element PZ is arranged bends outwards (towards the side opposite from the cavity 24) while being integrally connected with the piezoelectric element PZ, so that the volume of the cavity 24 increases.

Thus, the ink flows through the supply opening 24*a* from the liquid reservoir 22 in correspondence with the increase in volume of the cavity 24. In addition, when application of the drive signal to the piezoelectric element PC is then stopped after this state has been reached, the piezoelectric element PZ and the vibration plate 20 both return to their original shapes, and the cavity 24 also returns to its original volume. As a result, the pressure on the in the cavity 24 increases, causing spraying of a droplet L of the ink from the nozzle N towards the base material 101.

The droplet discharge head 9 having this type of configuration is arranged so as to protrude from the bottom surface 741, with the bottom surface of the nozzle plate 21, specifically, the surface NS on which the nozzles are formed (nozzle surface), facing downward from the bottom surface 741 of the carriage 740 as shown in FIG. 2.

Also, heating means such as a heater or the like (not illustrated) are provided respectively on the droplet discharge heads 9Y, 9C, 9M, 9K, 9Wa, and 9Wb, tube 710, tanks 11Y, 11C, 11M, 11K, 11Wa, and 11Wb. By the operation of the heating means, the ink is adjusted to have good spraying properties from the droplet discharge heads 9.

In addition, as shown in FIGS. 2 and 3, ultraviolet ray radiation means 12*a* and ultraviolet ray radiation means 12*b* are arranged adjacently on both sides on the carriage 740 sandwiching the six aligned droplet discharge heads 9. Specifically, the ultraviolet ray radiation means 12*a* and 12*b* are respectively arranged on both sides in the direction of alignment of the droplet discharge heads 9 that are aligned in the Y direction.

These ultraviolet ray radiation means 12*a* and 12*b* are for curing the ink, so with this embodiment, are constituted with a light source that emits ultraviolet rays. This light source radiates ultraviolet rays of the peak wavelength in the range described previously.

The heating device 790 is arranged at the downstream side part of the printing device 700. As shown in FIG. 16, one electric heater 791 of the pair of electric heaters 791 constituting the heating device 790 is mainly in charge of heating from the top side, and the other electric heater 791 is mainly in charge of heating from the bottom side.

The control device 780 is a device for outputting stage position control signals to the stage movement device 770, outputting carriage position control signals to the conveyance device 750, and further outputting drawing data and drive control signals to the drive circuit substrate (not illustrated) of the droplet discharge heads 9. As a result, the control device 780, in order to move the base material 101 and the carriage 740 relative to each other, performs an alignment operation of the base material 101 by moving the work stage 760, and synchronization control of the alignment operation of the droplet discharge heads 9 by movement of the carriage 740, and by further performing droplet spray operation of the droplet discharge heads 9, the radiation-curing ink droplets are placed at specified positions on the base material 101. Also, this control device 780 performs the ultraviolet ray radiation operation of the ultraviolet ray radiation means 12*a* and 12*b*, and the heating operation of the heating device 790 separately from performing the droplet spray operation of the droplet discharge heads 9.

The printing device 700 has a constitution like that described above.

Next, we will describe the method of manufacturing the printed material 100 using the printing device 700 in its loaded state, and also of manufacturing the molded article from the printed material 100, while referring to FIG. 9 through FIG. 18C.

With the printing device 700, using the first ink 1 and the second ink 2 to implement printing on the base material 101, it is possible to obtain the printed material 100. Then, when forming the colored printed layer 102, the droplet discharge heads 9Y, 9C, 9M, and 9K are selected as appropriate and used, but here, as an example, we will select and use the droplet discharge head 9K as a representative example.

Manufacturing Method (Printing Method)

Figure 9:
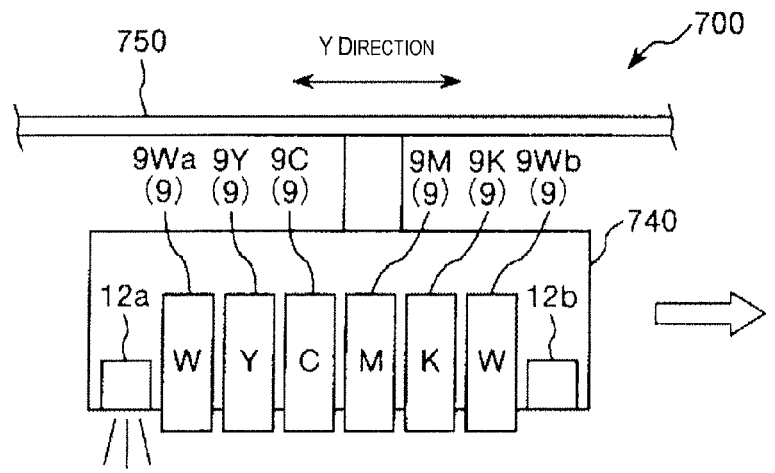
FIG. 9 is a partial cross section view showing the sequence of steps for manufacturing the printed material of the present invention, as well as manufacturing a molded article thereafter.

As shown in FIG. 9, the base material 101 is placed on the work stage 760. Then, the droplet discharge heads 9Y, 9C, 9M, 9K, 9Wa, and 9Wb as well as the ultraviolet ray radiation means 12*a* and 12*b* supported on the carriage 740 are collectively moved toward the right on the base material 101.

Also, the ultraviolet ray radiation means 12*a* operates and radiates ultraviolet rays. This operating state is maintained while the ultraviolet ray radiation means 12*a* is moving toward the right, specifically, is maintained during the forward path. Meanwhile, the ultraviolet ray radiation means 12*b* is stopped.

Figure 10:
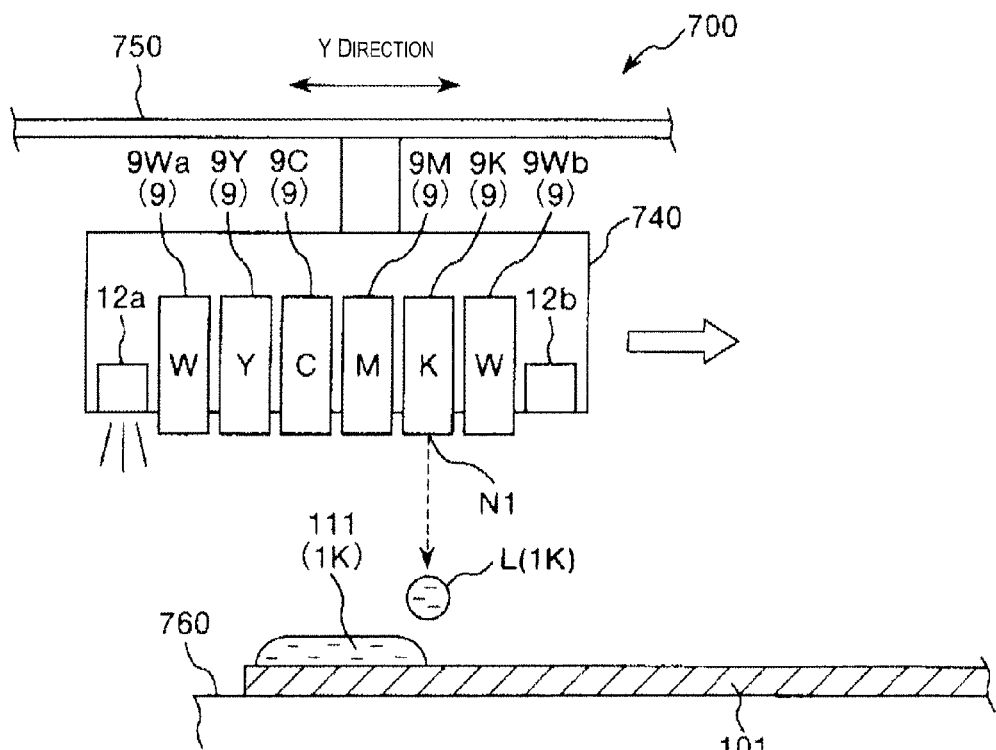
FIG. 10 is a partial cross section view showing the sequence of steps for manufacturing the printed material of the present invention, as well as manufacturing a molded article thereafter.

As shown in FIG. 10, the droplet discharge head 9K sprays the first ink 1K as droplets L on the part on which to form the printed layer 102 on the base material 101, and these are placed on the base material 101. At this time, as shown in FIG. 18A, on the base material 101, a large number of the first dots D1 made by landing of the first ink 1K droplets L, specifically, a coating film is formed, but the first dots D1 that are adjacent to each other in the Y direction overlap with each other while being slightly displaced in that direction (coating step).

Also, the first dots D1 adjacent to each other in the X direction overlap with each other while being slightly displaced in that direction (see FIG. 18A). This is possible by doing appropriate settings of the first nozzle N1 gap with the droplet discharge head 9K.

As the displacement volume (distance between centers $p_1$) of the first dots D1 with each other in the X direction and Y direction, though not particularly restricted, this can be 35 μm when the first dot D1 diameter is 50 μm, for example.

By this kind of placing of the first ink 1K, a layered first ink layer 111 constituted by the first ink 1K is formed on the base material 101.

As shown in FIG. 11, the first ink layer 111 is cured gradually from the left side part by ultraviolet rays from the ultraviolet ray radiation means 12a, to reliably become a cured film (curing step).

Also, when the droplet discharge head 9Wa reaches above the first ink layer 111, the second ink 2a is sprayed as the droplets L and placed on that first ink layer 111. At that time, as shown in FIG. 18B, many second dots D2 made by landing of the second ink 2a droplets L, specifically, a coated film, is formed in a houndstooth pattern (regular), but the second dots D2 which are adjacent to each other in the Y direction are separated in that direction (coating step). As this Y direction separation distance (distance between centers $p_{2y}$), though there is no particular restriction, for example, 2 times the distance between centers $p_1$ is preferable, and when the second dot D2 diameter is 50 μm, it is possible to make it 70 μm.

Also, the second dots D2 adjacent to each other in the X direction are also separated in that direction (see FIG. 18B). This is possible because the gap of the second nozzle N2 with the droplet discharge head 9Wa is set appropriately. As this X direction separation distance (distance between centers $p_{2x}$), though there is no particular restriction, for example, 4 times the distance between centers $p_1$ is preferable, and when the second dot D2 diameter is 50 μm, it is possible to make it 140 μm.

Then, as shown in FIG. 18C, the second dots D2 arranged in the houndstooth pattern in this way are respectively in contact with the first ink layer 111 (first dots D1) from vertically above.

Also, as shown in FIG. 11, the second dots D2 arranged in the houndstooth pattern are cured by ultraviolet rays from the ultraviolet ray radiation means 12a in sequence from the items positioned at the left side, and this reliably becomes a cured film (curing step).

With the above, the forward path ink coating and curing is completed.

Figure 12:
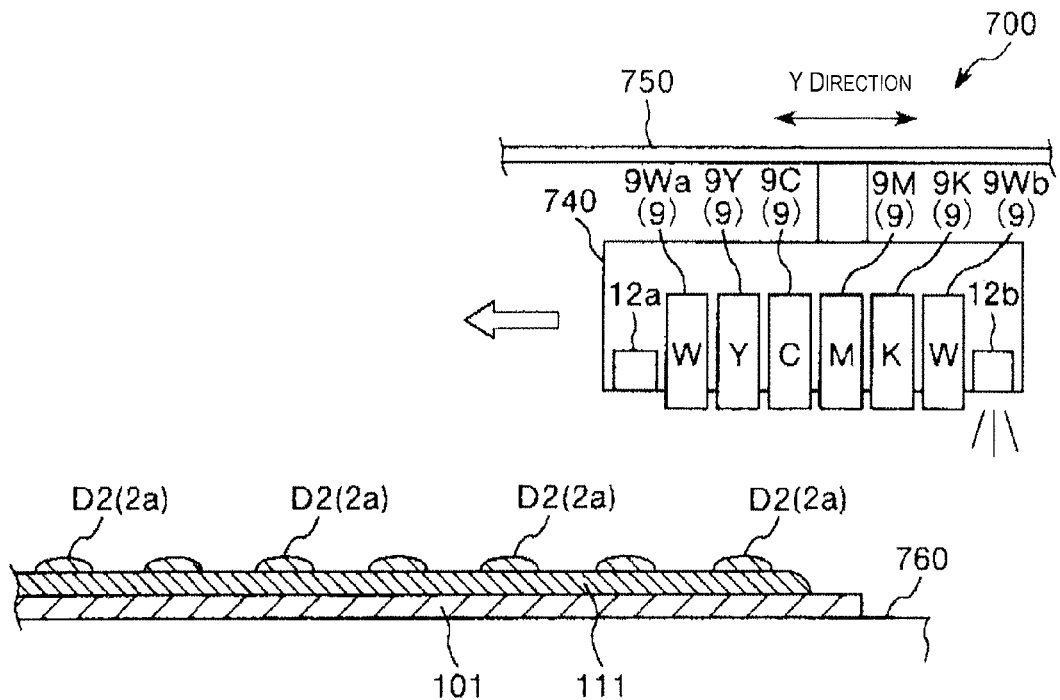
FIG. 12 is a partial cross section view showing the sequence of steps for manufacturing the printed material of the present invention, as well as manufacturing a molded article thereafter.

As shown in FIG. 12, with the return path, the droplet discharge heads 9Y, 9C, 9K, 9Wa, 9Wb, and the ultraviolet ray radiation means 12a and 12b supported on the carriage 740 are collectively moved in the leftward direction on the base material 101.

Also, the ultraviolet ray radiation means 12b operates and radiates ultraviolet rays. This operating state is maintained by the ultraviolet ray radiation means 12b through the forward path. Meanwhile, the ultraviolet ray radiation means 12a is stopped.

Figure 13:
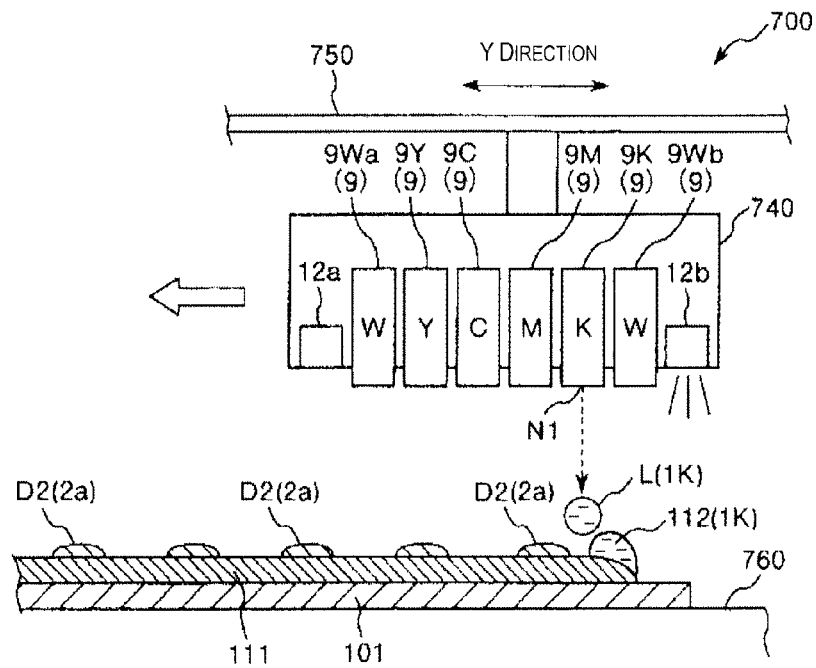
FIG. 13 is a partial cross section view showing the sequence of steps for manufacturing the printed material of the present invention, as well as manufacturing a molded article thereafter.

As shown in FIG. 13, the droplet discharge head 9K sprays and places first ink 1K droplets L on the cured first ink layer 111. At this time as well, the same as with the aforementioned forward path, as shown in FIG. 18A, a large number of first dots D1 (coating film) are formed, but the first dots D1 adjacent to each other in the Y direction overlap each other while being slightly skewed in that direction (coating step) (see FIG. 18A). Also, the first dots D1 adjacent to each other in the X direction are also overlapping while being slightly skewed in that direction (see FIG. 18A).

By this kind of placement of first ink 1K, on the first ink layer 111 formed with the forward path, a layered first ink layer 112 is further formed constituted by first ink 1K. This first ink layer 112 also covers the cured second dots D2 on the first ink layer 111 (cured film).

As shown in FIG. 14, the first ink layer 112 is gradually cured from the right side part by ultraviolet rays from the ultraviolet ray radiating means 12b, and this becomes a cured film (curing step).

Also, when the droplet discharge head 9Wb reaches above the first ink layer 112, the second ink 2b droplets L are sprayed and placed on that first ink layer 112. At this time as well, the same as with the forward path, as shown in FIG. 18B, a large number of second dots D2 (coated film) are formed in a houndstooth pattern, but the second dots D2 adjacent to each other in the Y direction are separated in that direction (coating step) (see FIG. 18B). Also, the second dots D2 adjacent to each other in the X direction are also separated in that direction (see FIG. 18B). Then, the second dots D2 arranged in a houndstooth pattern in this way are respectively in contact with the first ink layer 112 from vertically above (see FIG. 14, FIG. 18C).

Also, as shown in FIG. 14, the second dots D2 arranged in a houndstooth pattern are cured by ultraviolet rays from the ultraviolet ray radiation means 12b in sequence from the items positioned at the right side, and this becomes a cured film (curing step).

Then, as shown in FIG. 15, the coating and curing of the ink with the return path is completed, and the printed material 100 is obtained.

As shown in FIG. 16, the base material 101 on which the printed layer 102 is formed is arranged between the pair of electric heaters 791. Then, in this state, the printed layer 102 is heated at least one time for each base material 101 (heating step). The heating temperature for this (hereafter referred to as "first heating temperature") is the first glass transition point $Tg_1$ or greater, and preferably can be made to be the second glass transition point $Tg_2$ or greater, but it is also possible to make it less than the second glass transition point $Tg_2$.

Also, the heating time per heating is preferably 1 second or greater, and more preferably 1 to 60 seconds.

Using such heating conditions, as will be described later, a printed material 100 with good durability is obtained.

As shown in FIG. 17, the kind of machine processing described previously is implemented on the printed material 100 and the molded article 200 is obtained (molding step). As shown in FIG. 7, when implementing machine processing, it is preferable to implement that processing while heating the printed material 100 to the second glass transition point $Tg_2$ or greater. It is preferable that the heating temperature (hereafter referred to as the "second heating temperature") during this molding process (machine processing) and the first heating temperature be different, and that the second heating temperature be higher than the first heating temperature. It is preferable to satisfy either first glass transition point $Tg_1$<second heating temperature<second glass transition point $Tg_2$, or first glass transition point $Tg_1$<second glass transition point $Tg_2$<second heating temperature.

By going through this kind of process, on the base material 101, the first dots D1 are arranged "tightly" and the second dots D2 are arranged "loosely." As a result, the printed layer 102 total volume of first ink 1 is greater than the total volume of second ink 2. The total volume of second ink 2 is preferably 3 to 25% of the first ink 1, and more preferably 5 to 10%.

As described previously, the first cured substance for which the first ink 1 was cured has superior stretchability to the second cured substance for which the second ink 2 was cured. For example, when excess second ink 2 is placed, specifically, when the size relationship of the first ink 1 total volume and the second ink 2 total volume is inverted, there is the risk of losing this stretchability. As a result, it is thought that the printed layer 102 will be lacking in stretchability. However, with the previously noted total volume size relationship, it is possible to reliably prevent this kind of problem.

Also, by going through the aforementioned process, with the forward path, at the boundary part, the first ink layer 111 and each second dot D2 are partially mixed with each other before the ink is cured, but these are not mixed with the remaining part. With the return path as well, at the boundary part, the first ink layer 112 and each second dot D2 are partially mixed with each other before the ink is cured, but these are not mixed with the remaining part. Specifically, with both the forward path and the return path, the second ink 2 is partially mixed with the first ink 1, but the remaining part is prevented from mixing with the first ink 1.

However, for manufacturing of the molded article 200, when implementing machine processing on the printed material 100, there is concern that problems such as cracking and peeling or the like will occur on the printed layer 102 or at its periphery with the occurrence of changes in the internal stress due to that processing at the part at which that process is implemented. However, the occurrence of this kind of problem is prevented on the molded article 200. This will be described hereafter.

As described previously, the printed layer 102 is a layer made by curing a first ink 1 containing a pigment as a colorant, and a second ink 2 which is colorless and transparent. Then, after this ink cures, the printed layer 102 has first characteristics and second characteristics.

Here, we will consider the possibility of a first case when the printed layer 102 consists only of the cured first ink 1, and a second case when the printed layer 102 consists only of the cured second ink 2.

In the first case, using a TMA device, a constant pressure is applied to the printed layer 102 in a 30° C. environment, and the maximum displacement volume (indentation volume) at that time as well as the displacement recovery volume when the pressure was removed (restoration volume) were measured a plurality of times. Then, as the recovery rate, a calculation was done of the displacement recovery volume divided by the maximum displacement volume. As a result, though it varies according to the test conditions such as the size of the pressure and the like, we found that the recovery rate is average 30% (error range ±5%) (see FIG. 6). From this, with the first case, it is possible to say that the printed layer 102 is a layer that easily undergoes plastic deformation, and when machine processing is performed, problems such as cracking and peeling or the like occur.

Meanwhile, in the second case, we found that the recovery rate is average 80% (error range ±10%) (see FIG. 6). From this, with the second case, it is possible to say that the printed layer 102 is a layer that easily undergoes elastic deformation. The second ink 2 is colorless and transparent, and since this is not used alone, we omitted an evaluation of a case when machine processing was implemented on this printed layer 102.

However, with the present invention, the first case differs from the second case, with the printed layer 102 consisting of cured first ink 1 and second ink 2, and the mixing ratio depends on the density, but we found that the recovery rate average is 55% (error range ±3%) (see FIG. 6). As is also clear from FIG. 6, with the present invention, the printed layer 102 can be said to be a layer which has properties between those of the first case and the second case. Then, with the printed layer 102, with a synergistic effect of the effect of having good stretchability (according to the first characteristic) and the effect of having good elasticity (according to the second characteristic), even when machine processing is implemented on that printed layer 102, the occurrence of problems such as cracking, peeling and the like is reliably prevented.

In this way, on the colored first ink 1, the colorless and transparent second inks 2 for which color change of the first ink 1 color is prevented or suppressed is mixed (overlapped), and with a simple constitution of the ink having the first characteristic and second characteristic, the durability of the printed layer 102 is increased. By doing this, there is excellent workability when implementing machine processing on the printed material 100 having the printed layer 102 (coated surface) and manufacturing the molded article 200. Also, for example, when the molded article 200 is an automobile speedometer, it is possible to keep the high quality of the printed layer 102 as is over a long time in various environments such as when the internal temperature in the hot sun in the middle of summer is 50° C. or greater.

However, when manufacturing the molded article 200, when implementing machine processing on the printed material 100 while heating, changes in the internal stress due to that processing occur at the part at which that process is implemented on the printed layer 102 or at its periphery, so there is concern that problems such as cracking, peeling or the like may occur. However, the occurrence of this kind of problem is prevented on the molded article 200. This will be described hereafter.

As described previously, the printed layer 102 is a layer made by curing a first ink 1 containing a pigment as a colorant, and a second ink 2 which is colorless and transparent. Then, the printed layer 102 after curing is equipped with two characteristics, the characteristics of the first cured substance having the first glass transition point $Tg_1$, and the characteristics of the second cured substance having the first glass transition point $Tg_1$.

Here, we will consider the possibility of a first case when the printed layer 102 consists only of the cured first ink 1, and a second case when the printed layer 102 consists only of the cured second ink 2.

In the first case, using a TMA device, a constant pressure is applied to the printed layer 102 at normal temperature, and the maximum displacement volume (indentation volume) at that time as well as the displacement recovery volume when the pressure was removed (restoration volume) were measured a plurality of times. Then, as the recovery rate, a calculation was done of the displacement recovery volume divided by the maximum displacement volume. As a result, though it varies according to the test conditions such as the size of the pressure and the like, we found that the recovery rate is average 34% (see FIG. 8). From this, with the first case, it is possible to say that the printed layer 102 is a layer that easily undergoes plastic deformation, and when machine processing is performed, problems such as cracking and peeling or the like occur.

Meanwhile, in the second case, we found that the recovery rate is average 78% (see FIG. 8). From this, with the second case, it is possible to say that the printed layer 102 is a layer that easily undergoes elastic deformation. The second ink 2 is colorless and transparent, and since this is not used alone, we omitted an evaluation of a case when machine processing was implemented on this printed layer 102.

However, with the present invention, the first case differs from the second case, with the printed layer 102 consisting of cured first ink 1 and second ink 2, and the mixing ratio depends on the density, but we found that when heat treatment is not yet implemented, the recovery rate average is 51% (error range −6 to +10%) (see FIG. 8). Furthermore, when heat treatment is implemented at a first heating temperature of 120° C. for a heating time of 15 min, we found that with the printed layer 102, the recovery rate increases to average 73% (error range: −10 to +2%) (see FIG. 8).

As is also clear from FIG. 8, with the present invention, the printed layer 102 can be said to be a layer which has properties between those of the first case and the second case, and furthermore, for which those properties have improved. Then, with the printed layer 102, with a synergistic effect of the effect of having good stretchability (effect as the first cured substance) and the curing effect having good elasticity (effect as the second cured substance), even when machine processing is implemented on that printed layer 102, the occurrence of problems such as cracking, peeling and the like is reliably prevented.

In this way, on the colored first ink 1, the colorless, transparent second ink 2 for which color change of the first ink 1 color is prevented or suppressed is mixed (overlapped), and with a simple constitution for which the glass transition points of each ink cured substance are mutually different, the durability of the printed layer 102 increases. As a result, the workability is excellent when implementing machine processing on the printed material 100 having the printed layer 102 (coating surface) and manufacturing the molded article 200. Also, for example, when the molded article 200 is an automobile speedometer, it is possible to keep the high quality of the printed layer 102 as is over a long time in various environments such as when the internal temperature in the hot sun in the middle of summer is 50° C. or greater.

With the printed layer 102, it is preferable that the total mass of the aforementioned (b-1) polymerizable compound that the first ink 1 contains be the same or greater than the total mass of the aforementioned (b-2) polymerizable compound that the second ink 2 contains (e.g. 1.1 times or greater). As a result, it is possible to more reliably prevent the occurrence of cracking, peeling or the like on the printed layer 103 when machine processing is done on the printed material 100 (manufacturing the molded article 200), and there is even greater durability for the printed layer 102.

Also, in contrast to the present invention, we will consider a case of mixing the inks with each other and coating them on the base material 101 before coating the first ink 1 and the second ink 2 on the base material 101.

In this case, as a result, the printed layer 102 does not exhibit a synergistic effect of the effect due to the first characteristic and the effect due to the second characteristic, and problems such as cracking, peeling and the like occur. As a cause for the former, it is assumed that this may be because by mixing the inks together in advance, the dispersion stability of the pigment within that ink was damaged.

Second Embodiment

Figures 19A, 19B:
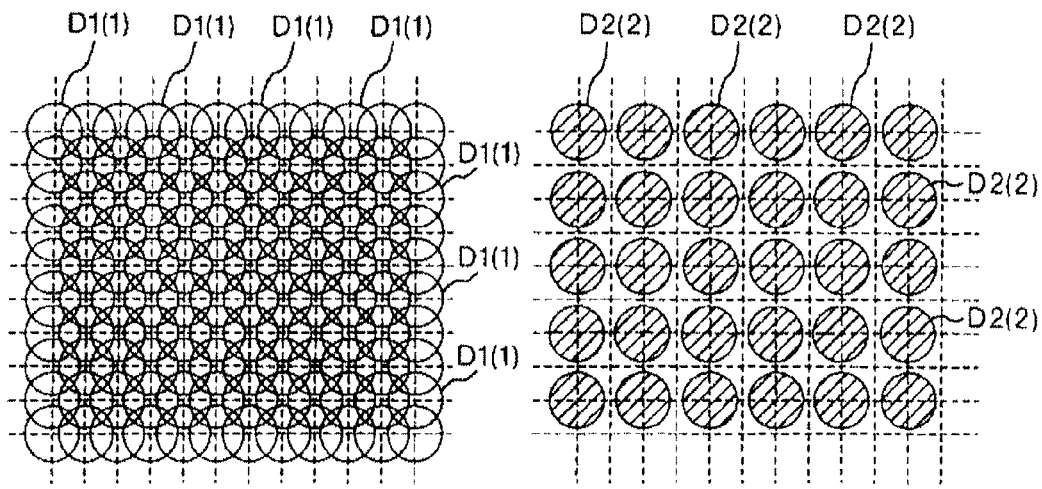
FIGS. 19A to 19C are plan views showing the state with the first ink and second ink respectively placed on the printing medium using the printing device of the present invention (second embodiment).
Figure 19C:
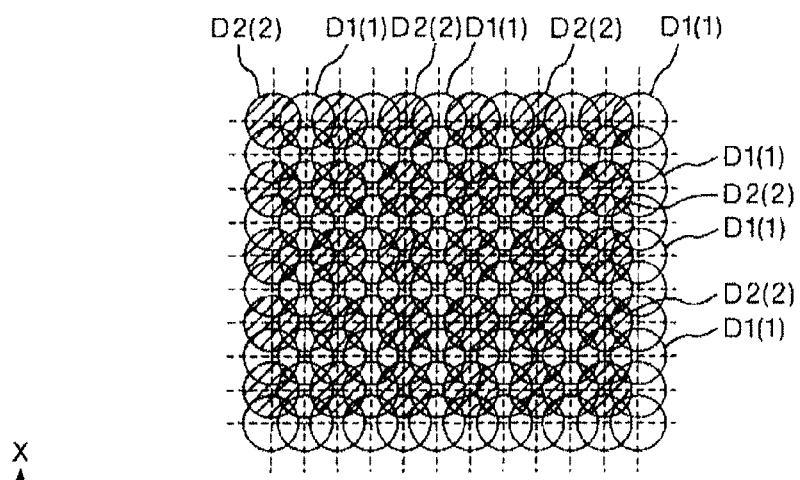

FIGS. 19A to 19C are plan views showing the state with the first ink and the second ink respectively placed on the printing medium using the printing device of the present invention (second embodiment).

Following, we will describe the second embodiment of the printing method, printing device, printed material and molded article using the printing device of the present invention while referring to the drawings, but we will describe these with a focus on the difference points from the embodiment described previously, and will omit a description of the same items.

This embodiment is the same as the aforementioned first embodiment other than that the placement state of the second ink is different.

As shown in FIG. 19B, the large number of second dots D2 are arranged in a matrix form, specifically, a grid form (cyclic), and the second dots D2 adjacent to each other are separated in that direction. The second dots D2 adjacent to each other in the X direction are also separated in that direction.

The arrangement of the first dots D1 shown in FIG. 19A is the same as the arrangement of the first dots D1 shown in FIG. 18A.

Then, as shown in FIG. 19C, each of the second dots D2 are respectively in contact with the first ink layer 111 (first dots D1) from vertically above.

In a case when machine processing is implemented on the printed layer 102 which has this kind of ink arrangement, the occurrence of problems such as cracking, peeling and the like on that printed layer 102 is reliably prevented.

Third Embodiment

FIGS. 20A to 20C are plan views showing the state with the first ink and the second ink respectively place on the printing medium using the printing device of the present invention (third embodiment).

Following, we will describe the third embodiment of the printing method, printing device, printed material and molded article using the printing device of the present invention while referring to the drawings, but we will describe these with a focus on the difference points from the embodiments described previously, and will omit a description of the same items.

This embodiment is the same as the aforementioned first embodiment other than that the placement state of the second ink is different.

As shown in FIG. 20B, a large number of second dots D2 are arranged randomly, and the second dots D2 adjacent to each other are mutually separated.

The arrangement of the first dots D1 shown in FIG. 20A is the same as the arrangement of the first dots D1 shown in FIG. 18A.

Then, as shown in FIG. 20C, each second dot D2 is respectively in contact with the first ink layer 111 (first dots D1) from vertically above.

Even when machine processing is implemented on the printed layer 102 which has this kind of arrangement, the occurrence of problems such as cracking, peeling and the like on that printed layer 102 is reliably prevented.

Also, with this kind of arrangement, it becomes difficult to see the second dots D2, specifically, they do not stand out and the aesthetics are improved.

Fourth Embodiment

Figure 21:
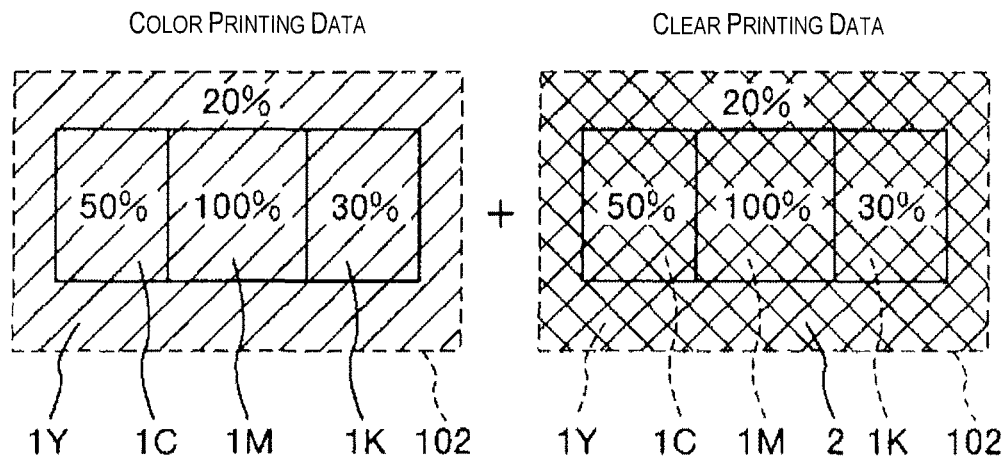
FIG. 21 is a plan view showing the state with the first ink and second ink respectively placed on the printing medium using the printing device of the present invention (fourth embodiment).

FIG. 21 is a plan view showing the state of the first ink and the second ink respectively placed on the printing medium using the printing device of the present invention (fourth embodiment).

Following, we will describe the fourth embodiment of the printing method, printing device, printed material and molded article using the printing device of the present invention while referring to the drawings, but we will describe these with a focus on the difference points from the embodiments described previously, and will omit a description of the same items.

This embodiment is the same as the aforementioned first embodiment other than that the placement state of the second ink is different.

As shown in FIG. 21, at the part that is the printed layer 102, specifically, the area for which printing is implemented on the base material 101, four colors of first ink 1 (with the illustrated constitution, Y:C:M:K=20:50:10:30) and a fixed amount of colorless, transparent second ink 2 for each color of first ink 1 are mixed.

As a result, at a plurality of different locations on the printed layer 102 (on the base material 101), at each of these, the ratio of the first inks 1 (1Y, 1C, 1M, 1K) and the second ink 2 is fixed. As a result, the effect of the second ink 2 on each color of first ink 1 is fixed, and it is possible to reliably prevent extreme color changes of each color of first ink 1 by the second ink 2.

Fifth Embodiment

Figure 22:
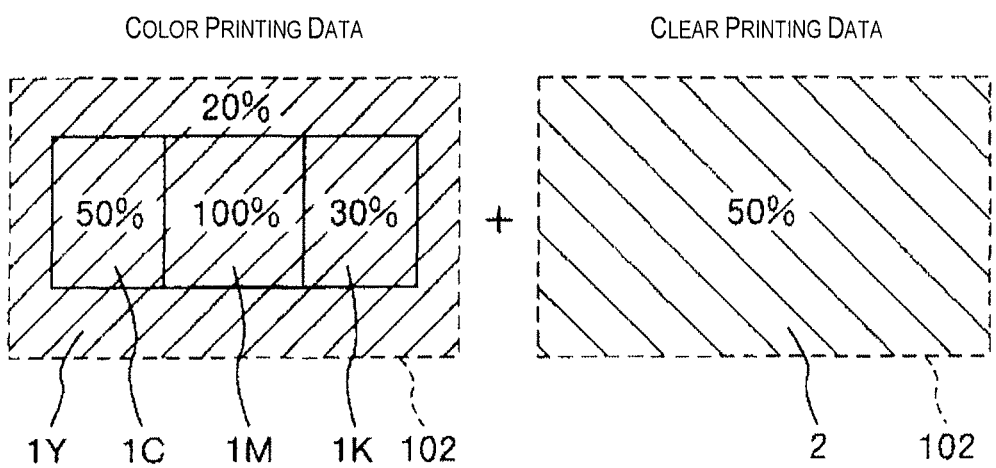
FIG. 22 is a plan view showing the state with the first ink and second ink respectively placed on the printing medium using the printing device of the present invention (fifth embodiment).

FIG. 22 is a plan view showing the state with the first ink and the second ink respectively placed on the printing medium using the printing device of the present invention (fifth embodiment).

Following, we will describe the fifth embodiment of the printing method, printing device, printed material and molded article using the printing device of the present invention while referring to the drawings, but we will describe these with a focus on the difference points from the embodiments described previously, and will omit a description of the same items.

This embodiment is the same as the aforementioned first embodiment other than that the placement state of the second ink is different.

For example, when forming the printed layer 102 having the desired stretchability, there are cases when it is possible to know the total volume of the second ink 2 in advance.

In such a case, as shown in FIG. 22, with the part this is the printed layer 102, it is possible to mix in advance four colors of first ink 1 (with the illustrated constitution, Y:C:M:K=20:50:100:30) and a fixed volume (with the illustrated constitution, 50%) of colorless, transparent second ink 2 with each color of first ink 1.

As a result, it is possible to reliably obtain the printed layer 102 having the desired stretchability.

Sixth Embodiment

Figure 23:
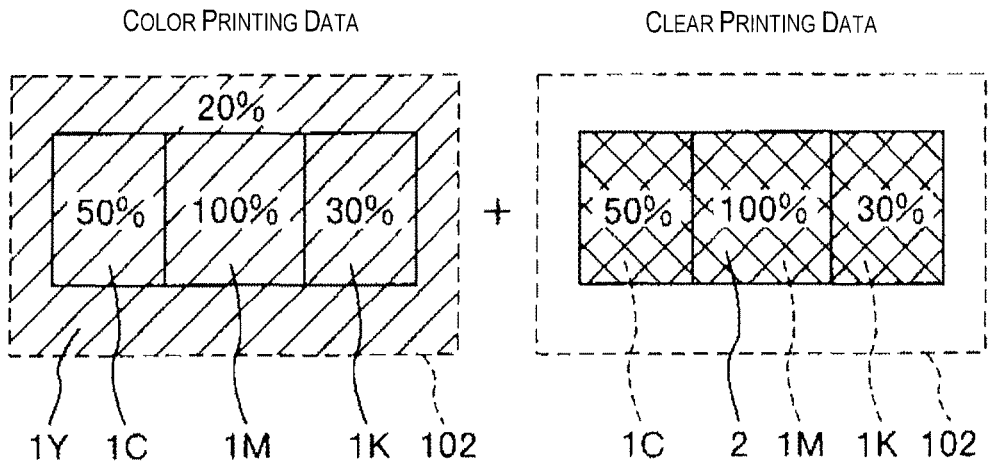
FIG. 23 is a plan view showing the state with the first ink and second ink respectively placed on the printing medium using the printing device of the present invention (sixth embodiment).

FIG. 23 is a plan view showing the state of the first ink and the second ink respectively placed on the printing medium using the printing device of the present invention (sixth embodiment).

Following, we will describe the sixth embodiment of the printing method, printing device, printed material and molded article using the printing device of the present invention while referring to the drawings, but we will describe these with a focus on the difference points from the embodiments described previously, and will omit a description of the same items.

This embodiment is the same as the aforementioned fourth embodiment other than that the placement state of the second ink is different.

As shown in FIG. 23, with the part that is the printed layer 102, four colors of first ink 1 (with the illustrated constitution, Y:C:M:K=20:50:100:30) and a fixed volume of colorless, transparent second ink 2 for three colors of the first ink 1 (1C, 1M, 1K) are mixed.

As a result, locally at the printed layer 102 for which the second ink 2 is mixed, specifically, a plurality of different locations of printed layer 102, the ratio of the first inks 1C, 1M, and 1K and the second ink 2 is fixed at all of these. As a result, the effect of the second ink 2 on the first inks 1C, 1M, and 1K is fixed, and it is possible to reliably prevent an extreme change in color of the first inks 1C, 1M, and 1K due to the second ink 2.

Seventh Embodiment

Figure 24:
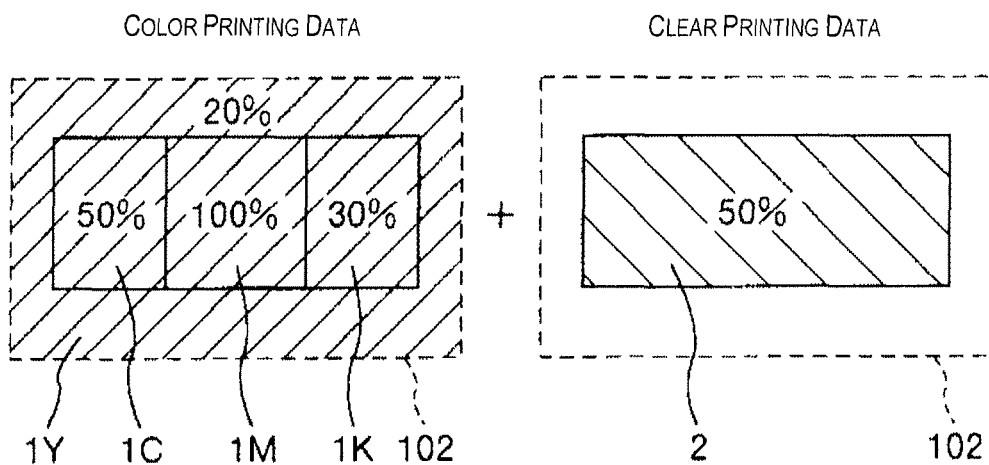
FIG. 24 is a plan view showing the state with the first ink and second ink respectively placed on the printing medium using the printing device of the present invention (seventh embodiment).

FIG. 24 is a plan view showing the state with the first ink and the second ink respectively placed on the printing medium using the printing device of the present invention (seventh embodiment).

Following, we will describe the seventh embodiment of the printing method, printing device, printed material and molded article using the printing device of the present invention while referring to the drawings, but we will describe these with a focus on the difference points from the embodiment described previously, and will omit a description of the same items.

This embodiment is the same as the aforementioned fifth embodiment other than that the placement state of the second ink is different.

For example, there are cases when it is possible to know the total volume of the second ink 2 in advance when forming a printed layer 102 for which a portion has the desired stretchability.

In such a case, as shown in FIG. 24, with the part that is the printed layer 102, four colors of first ink 1 (with the illustrated constitution, Y:C:M:K=20:50:100:30) and a fixed volume (with the illustrated constitution, 50%) of colorless, transparent second ink 2 can be mixed in advance with three colors of the first ink (1C, 1M, 1K).

As a result, it is possible to reliably obtain a printed layer 102 for which a portion has the desired stretchability.

Eighth Embodiment

FIG. 25 is a table as the calibration curve stored by the printing device of the present invention (eighth embodiment).

Following, we will describe the eighth embodiment of the printing method, printing device, printed material and molded article using the printing device of the present invention while referring to the drawings, but we will describe these with a focus on the difference points from the embodiment described previously, and will omit a description of the same items.

This embodiment is the same as the aforementioned first embodiment other than that the printing device constitution is different.

With this embodiment, the table shown in FIG. 25 as a calibration curve is stored in the control device 780 of the printing device 700. This table shows the relationship between the input information and output information. The input information is the material of the base material 101 (material 1, material 2, material 3, . . . ), and the display color (display color 1, display color 2, display color 3, . . . ) displayed by the first ink 1 and the second ink 2 mixed on the base material 101. As the output information, this is the mixing ratio of the first ink 1 and the second ink 2 (Y:C:M:K:W). A plurality of this kind of table is prepared according to the base material 101 color.

As the calibration curve, in addition to a table, it is also possible to use an arithmetic expression, for example.

Above, we described embodiments illustrating the printing method, printing device, printed material, and molded article of the present invention, but the present invention is not limited to this, and each part constituting the printing device, printed material, and molded article can be substituted with any constitution for which the same functions can be exhibited. It is also possible to add any constitution items.

Also, the printing method, printing device, printed material, and molded article of the present invention can be a combination of any two or more constitutions (features) among each of the aforementioned embodiments.

Also, with each of the aforementioned embodiments, of the first ink and the second ink, the first ink contains pigment as a colorant, but the invention is not limited to this, and for example, the second ink can also contain a pigment as a colorant.

Also, the ink set with each of the aforementioned embodiments had four colors of first ink, but the invention is not limited to this, and for example can have one color, two colors, three colors, or five colors of first ink.

Also, when implementing machine processing on the printed material, it is possible to perform that processing while heating that printed material.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing method for printing on a printing medium comprising:
    discharging, by a droplet discharge head, a first ink containing a first polymerization initiator and a first polymerizable compound on the printing medium to form a first layer;
    discharging, by the droplet discharge head, a plurality of droplets of a second ink that contains a second polymerization initiator and a second polymerizable compound to form on the first layer a plurality of discrete dots that correspond to the droplets, respectively, such that adjacent ones of the dots that have been formed on the first layer are spaced apart from each other;
    curing the first ink and the second ink; and
    discharging, by the droplet discharge head, the first ink on the first layer and the dots such that all outer surface of each of the dots is surrounded by the first ink,
    a glass transition point of a cured substance of the second ink being greater than a glass transition point of a cured substance of the first ink.

2. The printing method according to claim 1, wherein a total volume of the first ink is greater than a total volume of the second ink.

3. The printing method according to claim 1, wherein the glass transition point of the cured substance of the first ink is less than 100° C., and the glass transition point of the cured substance of the second ink is 100° C. or greater.

4. The printing method according to claim 1, wherein a difference between the glass transition point of the cured substance of the first ink and the glass transition point of the cured substance of the second ink is 300° C. or less.

5. The printing method according to claim 1, wherein of a total mass of the first polymerizable compound, a monofunctional polymerizable compound is 65 mass % or greater, and of the total mass of the second polymerizable compound, a multifunctional polymerizable compound is 50 mass % or greater.

6. The printing method according to claim 1, further comprising
    heating a cured film which is cured by the curing at least once at the glass transition point of the cured substance of the first ink or greater.

7. The printing method according to claim 6, wherein the glass transition point of the cured substance of the first ink is less than an upper limit value of a usage environment temperature in which the printed material is used, and
    the glass transition point of the cured substance of the second ink is the upper limit value or greater.

8. The printing method according to claim 1, wherein the discharging the first ink and the second ink includes discharging a plurality of first dots formed of the first ink such that the first dots adjacent to each other overlap each other on the printing medium.

9. The printing method according to claim 1, wherein the first ink is colored ink, and
    the second ink is colorless transparent ink.

10. The printing method according to claim 1, wherein the first ink has stretchability of 70% or greater when the first ink is cured and made to be a 5 μm thick film and the film is stretched in an environment of 150° C.

* * * * *